(12) United States Patent
Salters et al.

(10) Patent No.: US 11,655,009 B2
(45) Date of Patent: May 23, 2023

(54) LIGHT EMITTING DEVICE, COMPRISING LIGHT EMITTING UNITS BEING ARRANGED IN A PLANE FILLING PATTERN

(71) Applicant: KONINKLIJKE PHILIPS N.V., Eindhoven (NL)

(72) Inventors: Bart Andre Salters, Eindhoven (NL); Roelant Boudewijn Hietbrink, Utrecht (NL); Michael Maria Johannes Van Lierop, Nederweert (NL)

(73) Assignee: Koninklijke Philips N.V., Eindhoven (NL)

( * ) Notice: Subject to any disclaimer, the term of this patent is extended or adjusted under 35 U.S.C. 154(b) by 499 days.

(21) Appl. No.: 16/633,659

(22) PCT Filed: Jul. 24, 2018

(86) PCT No.: PCT/EP2018/069981
§ 371 (c)(1),
(2) Date: Jan. 24, 2020

(87) PCT Pub. No.: WO2019/025230
PCT Pub. Date: Feb. 7, 2019

(65) Prior Publication Data
US 2020/0207451 A1  Jul. 2, 2020

(30) Foreign Application Priority Data

Aug. 2, 2017 (EP) .................................... 17184512
Sep. 6, 2017 (EP) .................................... 17189629

(51) Int. Cl.
*B63B 59/04* (2006.01)
*C02F 1/32* (2023.01)

(52) U.S. Cl.
CPC .............. *B63B 59/04* (2013.01); *C02F 1/325* (2013.01); *C02F 2201/008* (2013.01);
(Continued)

(58) Field of Classification Search
CPC .... B63B 59/04; C02F 1/325; C02F 2201/008; C02F 2201/3222; C02F 2201/3227;
(Continued)

(56) References Cited

U.S. PATENT DOCUMENTS 5,424,925 A  6/1995 Jenke et al.
6,288,497 B1  9/2001 Chang et al.
(Continued)

FOREIGN PATENT DOCUMENTS

TW  201701456 A  1/2017
WO  2009069076 A1  6/2009
(Continued)

OTHER PUBLICATIONS

International Search Report from PCT/EP2018/069981 dated Sep. 11, 2018.

*Primary Examiner* — Walter D. Griffin
*Assistant Examiner* — Cameron J Allen

(57) ABSTRACT

A light emitting device (1) is provided that can be used in various contexts, including the context of realizing an antifouling action on surfaces. The light emitting device (1) comprises light emitting units (10) being arranged in a plane filling pattern (20) for covering at least a substantial portion of a surface. Individual light emitting units (10) are electrically interconnected through connection areas (12, 13) as present on the light emitting units (10) for providing electrical access to an internal electrical circuit (11) thereof, wherein the light emitting units (10) overlap at the positions of at least portions of the connection areas (12, 13) thereof. Further, it may be so that at least one of the connection areas
(Continued)

(12, 13) of the individual light emitting units (10) is electrically connected simultaneously to respective connection areas (12, 13) of at least two other light emitting units (10).

27 Claims, 11 Drawing Sheets

(52) U.S. Cl.
CPC ............ *C02F 2201/3222* (2013.01); *C02F 2201/3227* (2013.01); *C02F 2303/04* (2013.01); *C02F 2303/20* (2013.01)

(58) Field of Classification Search
CPC .......... C02F 2201/3228; C02F 2303/04; C02F 2303/20; F21S 2/00; F21V 23/06; H01L 25/0753

See application file for complete search history.

(56) References Cited

U.S. PATENT DOCUMENTS

| | | |
|---|---|---|
| 7,108,392 B2 | 9/2006 | Strip et al. |
| 7,675,075 B2 | 3/2010 | Nagai |
| 9,074,758 B2 | 7/2015 | Oraw et al. |
| 9,611,016 B2 | 4/2017 | Salters |
| 10,556,651 B2 | 2/2020 | Salters |
| 2005/0248935 A1* | 11/2005 | Strip ................... H01L 27/3293 362/145 |
| 2008/0037284 A1 | 2/2008 | Rudisill |
| 2009/0096362 A1 | 4/2009 | Diekmann et al. |
| 2015/0267907 A1 | 9/2015 | Thompson et al. |
| 2017/0141076 A1 | 5/2017 | Ito |
| 2018/0215450 A1 | 8/2018 | Janssen et al. |

FOREIGN PATENT DOCUMENTS

| | | | |
|---|---|---|---|
| WO | WO-2009069076 A2 * | 6/2009 | ............... E04B 9/32 |
| WO | 2012041456 A1 | 4/2012 | |
| WO | 2014188347 A1 | 5/2014 | |
| WO | 2017016940 A1 | 2/2017 | |

* cited by examiner

LIGHT EMITTING DEVICE, COMPRISING LIGHT EMITTING UNITS BEING ARRANGED IN A PLANE FILLING PATTERN

CROSS-REFERENCE TO PRIOR APPLICATIONS

This application is the U.S. National Phase application under 35 U.S.C. § 371 of International Application No. PCT/EP2018/069981, filed on Jul. 24, 2018, which claims the benefit of EP Patent Application No. EP 17184512.6, filed on Aug. 2, 2017 and EP Patent Application No. EP 17189629.3, filed on Sep. 6, 2017. These applications are hereby incorporated by reference herein.

FIELD OF THE INVENTION

In the first place, the invention relates to a light emitting device, comprising light emitting units being arranged in a plane filling pattern for covering at least a substantial portion of a surface, wherein individual light emitting units comprise an internal electrical circuit and at least two connection areas providing electrical access to the internal electrical circuit from outside of the light emitting units, and wherein the light emitting units are electrically interconnected through the connection areas thereof.

In the second place, the invention relates to a set of light emitting units designed to be arranged in a plane filling pattern for covering at least a substantial portion of a surface and to thereby constitute the light emitting device as mentioned, wherein individual light emitting units of the set comprise an internal electrical circuit and at least two connection areas providing electrical access to the internal electrical circuit from outside of the light emitting units, and wherein the connection areas of the light emitting units are designed to enable an arrangement of the light emitting units in which the light emitting units are electrically interconnected through the connection areas thereof.

In the third place, the invention relates to an assembly of a marine object and the light emitting device as mentioned, the marine object comprising at least one surface that is intended to be at least partially submersed in a fouling liquid containing biofouling organisms during at least a part of the lifetime of the marine object, and the light emitting device being arranged on the at least one surface.

In the fourth place, the invention relates to a method for assembling a light emitting device, comprising the steps of providing light emitting units comprising an internal electrical circuit and at least two connection areas providing electrical access to the internal electrical circuit from outside of the light emitting units, arranging the light emitting units in a plane filling pattern for covering at least a substantial portion of a surface, and electrically interconnecting the light emitting units through the connection areas thereof.

BACKGROUND OF THE INVENTION

In general, the invention is in the field of realizing a light emission effect by using a number of light emitting units arranged in a plane filling pattern. One possible specific application of the invention is an application for the purpose of anti-fouling of surfaces. The background of the invention will now be explained in the context of that specific application, which should not be understood so as to imply that the invention is limited to that application.

Fouling of surfaces that are exposed to water, during at least a part of their lifetime, is a well-known phenomenon that causes substantial problems in many fields. For example, in the field of shipping, biofouling on the hull of ships is known to cause a severe increase in drag of the ships, and thus increased fuel consumption of the ships. In this respect, it is estimated that an increase of up to 40% in fuel consumption can be attributed to biofouling.

In general, biofouling is the accumulation of microorganisms, plants, algae, small animals and the like on surfaces. According to some estimates, over 1,800 species comprising over 4,000 organisms are responsible for biofouling. Hence, biofouling is caused by a wide variety of organisms, and involves much more than an attachment of barnacles and seaweeds to surfaces. Biofouling is divided into micro fouling which includes biofilm formation and bacterial adhesion, and macro fouling which includes the attachment of larger organisms. Due to the distinct chemistry and biology that determine what prevents them from settling, organisms are also classified as being hard or soft. Hard fouling organisms include calcareous organisms such as barnacles, encrusting bryozoans, mollusks, polychaetes and other tube worms, and zebra mussels. Soft fouling organisms include non-calcareous organisms such as seaweed, hydroids, algae and biofilm "slime". Together, these organisms form a fouling community.

Biofouling can cause machinery to stop working and water inlets to get clogged, to mention only two other negative consequences than the above-mentioned increase of drag of ships. In any case, the topic of anti-biofouling, i.e. the process of removing and/or preventing biofouling, is well-known.

WO 2014/188347 A1 discloses a method of anti-fouling of a surface while said surface is at least partially submersed in a liquid environment, in particular an aqueous or oily environment. The method involves providing an anti-fouling light and providing an optical medium in close proximity to such a protected surface, the optical medium having a substantially planar emission surface. At least part of the light is distributed through the optical medium in a direction substantially parallel to the protected surface, and the anti-fouling light is emitted from the emission surface of the optical medium, in a direction away from the protected surface. The anti-fouling light may be ultraviolet light, and the optical medium may comprise ultraviolet transparent silicone, i.e. silicone that is substantially transparent to ultraviolet light, and/or ultraviolet grade fused silica, in particular quartz.

By applying the method known from WO 2014/188347 A1, it is possible to cover a protected surface to be kept clean from biofouling, at least to a significant extent, with a layer that emits germicidal light. The protected surface can be the hull of a ship, as mentioned earlier, but the method is equally applicable to other types of surface.

WO 2014/188347 A1 further discloses a lighting module that is suitable to be used for putting the above-mentioned method to practice. Thus, the lighting module comprises at least one light source for generating anti-fouling light and an optical medium for distributing the anti-fouling light from the light source. The at least one light source and/or the optical medium may be at least partially arranged in, on and/or near the protected surface so as to emit the anti-fouling light in a direction away from the protected surface.

The lighting module known from WO 2014/188347 A1 may be provided as a foil that is suitable for application to the protected surface. The foil may be substantially size-limited in two orthogonal directions perpendicular to a thickness direction of the foil, so as to provide a tile-shaped anti-fouling unit; in another embodiment, the foil is substantially size-limited in only one direction perpendicular to the thickness direction of the foil, so as to provide an elongated strip of anti-fouling foil.

The concept of having tile-shaped anti-fouling units is particularly interesting when it comes to subjecting large surfaces to an anti-fouling action, which may be surfaces being as large as up to more than 10,000 m². Anti-fouling units can be of any suitable shape and size. For example, square units may be used and arranged in a regular pattern on a ship's hull for forming an anti-fouling light emitting device on the hull, wherein each unit may be dimensioned so as to cover about 1 m² of the hull. For the purpose of proper operation of the anti-fouling light emitting device, the units need to be electrically interconnected, and the whole of the units needs to be connected to an electric power source as well. However, the costs of the light emitting device are directly related to the number of connections to the units. Further, in some cases, connections to the units are quite vulnerable to water ingress, and thus electrical shorts may occur when at least a part of the anti-fouling light emitting device is actually under the waterline. It would be easy to reduce the risk of malfunctions, namely by limiting the amount of connections, if it was not for the fact that it is also important for the device to have a certain level of electrical redundancy. For the sake of completeness, it is noted that the term "redundancy" as used in the present text should be understood so as to relate to alternative paths for the power in case of failure of a unit or a connection between units. The more alternative paths are available, the less likely it is for the units to be cut off from a power source in case of damage to the light emitting device, and the higher the electrical redundancy. In fact, electrical redundancy of a light emitting device is high if a layout is chosen such that functioning of the device is not affected by damage to the layout, even if damage occurs at many different positions, and if malfunctioning of one or more units does not cause other units to be inoperative as well, whereas electrical redundancy of a light emitting device is low if a layout is chosen such that functioning of the device is affected by damage to the layout at only one or a few positions and/or by malfunctioning of only one or a few units.

In a light emitting device, all of the light emitting units that are included in the device need to be connected to the electric power source somehow. For obvious reasons, it is desirable to only have one electric power source for powering a large number of light emitting units. In order to prevent a situation in which as many electric wires or other electrically conductive elements as light emitting units would be needed for electrically interconnecting each of the light emitting units and the power source, it is practical to daisy chain light emitting units, which implies that light emitting units are connected in a successive arrangement, wherein one end of the daisy chain is connected to the power source. However, a long series of daisy chained light emitting units has no redundancy and is quite vulnerable to damage of a single connection between light emitting units and/or of a light emitting unit. When one connection or light emitting unit fails, all light emitting units down the line of that connection or light emitting unit cannot be powered. Introducing redundancy would require using more than a minimum of two electrical connections per light emitting unit so as to have additional connections allowing for alternative routes of the electric power. It is an object of the invention to provide a practical solution to the situation of the conflicting requirements of limiting the number of connections on the one hand and having a sufficient level of electrical redundancy on the other hand.

WO 2009/069076 A2 relates to an electronic tile that implements variable parameters such as color and/or brightness and/or temperature. The tile is intended to be inserted in a system of several identical tiles for covering a surface, which system comprises a special tile for controlling the various parameters, so that a person can change the appearance of the system of tiles according to desire. At least one tile of the system is connected to the electrical supply.

The tile known from WO 2009/069076 A2 may particularly comprise one or more LEDs and is designed to implement the functionalities thereof without any wiring. Assuming a square periphery of the tile, in which case the tile has four corners, it may be so that the tile is recessed at the position of the corners, and that electrical contacts of the tile are positioned at that very position. Connecting one tile to another involves using a separate piece having electrical contacts as well, which is then made to contact both a corner of the one tile and a corner of the other tile.

WO 2012/041456 A1 relates to a lighting system for decorating a wall, a ceiling or a floor. The lighting system comprises a plurality of square decorative tiles, a plurality of contact elements being arranged on the border region of each of the tiles, including the corners of each of the tiles. The decorative tiles are electrically connected to each other through their contact elements, wherein physical connections between the contact elements of respective tiles are realized through contact plates which are placed at appropriate positions in the lighting system.

SUMMARY OF THE INVENTION

According to a first aspect of the invention, a light emitting device is provided, that comprises light emitting units being arranged in a plane filling pattern for covering at least a substantial portion of a surface, wherein individual light emitting units comprise an internal electrical circuit and at least two connection areas providing electrical access to the internal electrical circuit from outside of the light emitting units, wherein the light emitting units are electrically interconnected through the connection areas thereof, wherein at least one of the connection areas of individual light emitting units is electrically connected simultaneously to respective connection areas of at least two other light emitting units, and wherein the light emitting units overlap at the positions of at least portions of the connection areas where individual light emitting units are electrically connected simultaneously to respective connection areas of at least two other light emitting units.

As explained in the foregoing, connecting an electrically conductive element to each light emitting unit for enabling each light emitting unit to be directly connected to an electric power source would yield a high level of electrical redundancy, but would result in an unacceptable amount of electrically conductive elements and an associated risk of failures/electrical shorts. Daisy chaining light emitting units does not offer a practical solution to the problem, as doing so involves a risk of a number of light emitting units being rendered inoperable when only one connection in a chain of light emitting units fails. Making a structure of connections in order to have each light emitting unit in a daisy chain of light emitting units and to also allow for an alternative power route through an adjacent daisy chain would increase the level of electrical redundancy without a need for providing a way of enabling each light emitting unit to be directly connected to an electric power source, but would involve a large number of electrical connections between the light emitting units.

The invention proposes another approach and relies on making electrical connections between at least three light emitting units at one position, namely a position where respective connection areas of the at least three light emitting units come together, at least in a functional sense, so that the connection areas can be interconnected. In that way, it appears to be possible to reduce the number of physical connections between light emitting units while maintaining an acceptable level of electrical redundancy. In particular, it appears that by making connections between at least three light emitting units at one position, which will hereinafter be referred to as combined connections, an effective structure is obtained in which individual light emitting units are at a position for receiving power through alternative connection routes, so that failure of a light emitting unit or a connection to a light emitting unit does not affect the functioning of the other light emitting units, and in which the number of physical connections that is needed for realizing the structure is reduced.

For example, it is possible for the light emitting device to comprise combined connections of four light emitting units. In such a case, compared to a conventional situation in which each connection is only between two light emitting units, it is achieved that the total number of connections between light emitting units in the light emitting device can be reduced by roughly 50% while still having the same level of electrical redundancy. Further, in such a case, it may be practical for the light emitting units to be arranged in a regular pattern of rows and columns of light emitting units, and for the combined connections of four light emitting units to be located at positions where four light emitting units meet, i.e. positions both between two rows and between two columns, which will hereinafter be referred to as nodal positions. In such a pattern, in order to have the sufficient level of electrical redundancy as desired, it is not necessary for all nodal positions between the light emitting units as present in the pattern to be positions where four light emitting units are interconnected. Instead, it may suffice if combined connections are provided at every other nodal position, both in the direction of the rows and the direction of the columns of the pattern.

Within the framework of the invention, the actual physical positioning of at least three light emitting units as may be involved in a combined connection can be chosen freely, provided that the at least three light emitting units overlap at the positions of at least portions of the connection areas where the at least three light emitting units are electrically connected simultaneously to respective connection areas of the at least two other light emitting units. Those light emitting units may be arranged in the plane filling pattern so as to mainly be adjacent light emitting units in a physical sense, but that is not essential. The fact is that the concept of interconnecting respective connection areas of at least three light emitting units is not limited to any physical way of establishing electrical connections. All light emitting units of the light emitting device may be of a single type, i.e. may be identical, but it is also possible that two or even more different types of light emitting units are applied in the light emitting device. In this respect, it may especially be practical if light emitting units of at least two different shapes are applied in the light emitting device.

For the sake of completeness, it is noted that the term "a plane filling pattern" should be understood in a practical sense, i.e. so as to cover various options which would normally be denoted by a skilled person by means of the term, including an option according to which light emitting units are arranged in a closely adjoining fashion, with practically no space between the light emitting units, and an option according to which light emitting units are arranged beside each other with only a narrow space between them. In general, the term is applicable to both a pattern in which the light emitting units are arranged so as to form a continuous cover of a surface and a pattern in which the light emitting units are arranged so as to form a cover of a surface that is provided with interruptions, the interruptions being no more than small areas between the light emitting units, wherein the larger part of the total area of the pattern is occupied by the light emitting units. In any case, it may particularly be so that mutual distances between light emitting units are significantly smaller than general dimensions of the light emitting units. In general, the light emitting units may be provided as tiles, panels or the like suitable for arrangement on a surface to be covered.

In practical situations, it may be so that the light emitting device comprises a number of light emitting units that cannot be typified as being light emitting units of which at least one of the connection areas is involved in a combined connection, especially light emitting units having a corner position or a side position in a pattern of light emitting units, which does not alter the fact that the invention is realized in the other light emitting units, which will normally be the majority of the total number of light emitting units of a light emitting device.

As mentioned in the foregoing, the light emitting units comprise at least two connection areas for providing electrical access to the internal electrical circuit of the light emitting units from outside of the light emitting units. Within the framework of the invention, it may be so that at least two of the connection areas of individual light emitting units are electrically connected simultaneously to respective connection areas of at least two other light emitting units, i.e. are involved in a combined connection. In such a case, considering the option as mentioned at the level of an arbitrary light emitting unit from the pattern, it is most practical if one of the at least two of the connection areas of the light emitting unit is involved in a combined connection between the light emitting unit and a first set of at least two other light emitting units, and another of the at least two of the connection areas of the light emitting unit is involved in a combined connection between the light emitting unit and a second set of at least two other light emitting units, different from the first set of at least two other light emitting units, so that the light emitting unit is connected to as many other light emitting units as possible.

It is to be noted that the invention also covers an option according to which no more than two of the connection areas of individual light emitting units are electrically connected simultaneously to respective connection areas of at least two other light emitting units. Further, it may be practical if (exactly) two of the connection areas of individual light emitting units are electrically connected simultaneously to respective connection areas of at least two other light emitting units.

Alternatively or additionally, it may be so that at least one other of the connection areas of the light emitting units is electrically connected to a connection area of only one other light emitting unit. In other words, the invention is already put to practice if not all of the connection areas of the light emitting units are involved in a combined connection, wherein it is possible for the light emitting device to comprise both combined connections and conventional, single connections between light emitting units.

According to the invention, the light emitting units are arranged so as to overlap at the positions of at least portions of the connection areas where individual light emitting units are electrically connected simultaneously to respective connection areas of at least two other light emitting units, i.e. at the positions of at least the connection areas that are involved in combined connections between light emitting units. For example, it may be so that individual light emitting units comprise at least one recessed portion, wherein at least one connection area of the light emitting units comprises at least one electrically conductive connection member that is arranged on the light emitting units at the position of their at least one recessed portion, and that is in electrical connection with the internal electrical circuit of the light emitting units, and wherein the light emitting units partially overlap at the positions of their recessed portions. The electrically conductive connection member of the at least one connection area may be realized in the form of an electrically conductive strip extending on an external surface portion of the light emitting unit, for example.

Letting the light emitting units partially overlap at the positions of recessed portions of the light emitting units allows for having an arrangement in which the light emitting units are located at a single level, especially when a height of the light emitting units at the positions of the recessed portions is chosen to be no more than half of a general height of the light emitting units, and the light emitting units are alternately arranged with the recessed portion up and the recessed portion down so that the recessed portions of the light emitting units can face each other whereas, apart from the recessed portions, the light emitting units are arranged beside each other.

As is the case in conventional situations, the light emitting device may comprise electrically conductive wiring for establishing the necessary electrical connections between the light emitting units. For example, wire assemblies of electrically interconnected wires may be provided for establishing combined connections between at least three light emitting units, wherein each of the at least three light emitting units is connected to a respective wire end of the wire assemblies. However, it may be more practical if another type of electrically conductive element is used, such as an electrically conductive bump or track. In any case, the connection areas of the light emitting units may comprise an electrically conductive strip or the like, as already suggested in the foregoing, in which case something like an electric wire, or an electrically conductive bump or track may be provided so as to interconnect the electrically conductive strips or the like. In general, any connector known for making electrically conductive connections at a relatively small scale will do. Alternatively, the electrically conductive strips or the like may be pressed against each other so as to contact each other, may be interconnected through soldering or another suitable attaching technique, or may be allowed to face each other at a certain small distance so as to enable transfer of electric power on the basis of capacitive effects.

Within the framework of the invention, it is possible to formulate the prerequisite that an electrical path between two positions where at least three light emitting units are interconnected through respective connection areas thereof extends through at least one light emitting unit. When the prerequisite is applied, indeed, it is not possible to have an electrically conductive element in the light emitting device that serves as a direct electrical interconnection between two positions of combined connections between at least three light emitting units.

The light emitting units may have any appropriate shape and size. For the sake of completeness, it is noted that the term "light emitting unit" as used in the present text should be understood so as to cover any possible unit having a light emitting functionality, including a light emitting tile, panel, block, blanket, etc. In a practical embodiment of the light emitting device according to the invention, the light emitting units may have a periphery with a number of sides and corners interconnecting the sides. For example, it is possible for the light emitting units to have a generally rectangular or square periphery, a triangular periphery, or a hexagonal periphery. In such a case, the at least one of the connection areas of individual light emitting units that is electrically connected simultaneously to respective connection areas of at least two other light emitting units may be located at a corner position on the light emitting units. When the light emitting units have a generally quadrilateral periphery, such as a generally rectangular or square periphery as mentioned, and at least two of the connection areas of individual light emitting units are involved in a combined connection, it may be so that those connection areas are located at opposite corner positions of the light emitting units so as to have optimal reachability of the connection areas. It is noted that the term "corner position" as used in the present text should be understood so as to cover a position in a corner area of a light emitting unit, i.e. a position exactly at a corner of the light emitting unit or a position near a corner of the light emitting unit that would be indicated by a skilled person as being a corner position rather than a position at a side of the light emitting unit.

As suggested in the foregoing, one of the possible fields of use of the invention is the field of anti-fouling of surfaces. In this respect, it is noted that individual light emitting units may comprise at least one light source that is configured to emit anti-fouling light during operation thereof. For example, the at least one light source may comprise at least one light emitting diode (LED), which does not alter the fact that an application of one or more other types of light source is possible within the framework of the invention. In any case, it may be so that the at least one light source is configured to emit ultraviolet light during operation thereof, so that the light emitting device is suitable to be used for anti-biofouling purposes. In general, the light emitting units may be of any suitable design, and may comprise an optical medium in which the at least one light source is embedded, or a kind of casing accommodating the at least one light source, for example. Advantageously, when the light emitting device is intended to be used underwater, the light emitting units are electrically interconnected in a liquid-tight fashion.

It is practical for the light emitting device according to the invention to comprise a single electric power source that is configured to power all of the light emitting units. Such an electric power source may be electrically connected to just one light emitting unit, or only a limited number of the light emitting units, such as two or three, or a larger number of the light emitting units, such as a number in a range of 10-50, whatever may be applicable in an actual case. As all light emitting units are electrically interconnected, it suffices for an electric power source to be electrically connected to just a single light emitting unit. However, in order to avoid total failure of the light emitting device when the connection between the electric power source and the single light emitting unit fails, it may be practical for the electric power source to be connected to more than one light emitting unit. Alternatively or additionally, it may be so that an electric power source is connected to a light emitting unit through more than one electrically conductive element, so that if one electrically conductive element fails for some reason, power supply to the light emitting units through the light emitting unit in question is still guaranteed through the at least one other electrically conductive element.

The invention also relates to the light emitting device in an unassembled condition, i.e. to a set of light emitting units designed to be arranged in a plane filling pattern for covering at least a substantial portion of a surface and to thereby constitute the light emitting device, wherein individual light emitting units of the set comprise an internal electrical circuit and at least two connection areas providing electrical access to the internal electrical circuit from outside of the light emitting units, wherein the connection areas of the light emitting units are designed to enable an arrangement of the light emitting units in which the light emitting units are electrically interconnected through the connection areas thereof, and wherein the connection areas of the light emitting units are designed to enable an arrangement of the light emitting units in which the light emitting units overlap at the positions of at least portions of the connection areas thereof.

The light emitting device according to the invention may be designed so as to be suitable for use with a marine object, particularly a marine object comprising at least one surface that is intended to be at least partially submersed in a fouling liquid containing biofouling organisms during at least a part of the lifetime of the marine object. In an assembly of such a light emitting device and marine object, the light emitting device is arranged on the at least one surface of the marine object. In the context of the present text, the term "marine object" is not limited to objects for use in salt water, but is to be understood so as to include objects for use in fresh water as well. Examples of marine objects include ships and other vessels, marine stations, sea-based oil or gas installations, buoyancy devices, support structures for wind turbines at sea, structures for harvesting wave/tidal energy, sea chests, underwater tools, etc. A marine object is only one example of the many objects that may be equipped with the light emitting device according to the invention.

The invention provides a light emitting unit for use in a light emitting device, particularly a light emitting unit comprising an internal electrical circuit and at least two connection areas providing electrical access to the internal electrical circuit from outside of the light emitting unit. In conformity with that which has already been explained in the foregoing, in view of the fact that the light emitting units are intended to be arranged in a partially overlapping fashion, it may be practical for the light emitting unit to comprise at least one recessed portion, wherein at least one connection area comprises at least one electrically conductive member that is arranged on the light emitting unit at the position of the at least one recessed portion, and that is in electrical connection with the internal electrical circuit. Alternatively or additionally, the light emitting unit may have a periphery with a number of sides and corners interconnecting the sides, wherein at least one of the connection areas is located at a corner position on the light emitting unit. For example, as explained earlier, the light emitting unit may have a generally quadrilateral periphery and may be electrically connectable at two opposite corner positions thereof.

The invention further relates to a method for assembling a light emitting device, comprising the steps of providing light emitting units comprising an internal electrical circuit and at least two connection areas providing electrical access to the internal electrical circuit from outside of the light emitting units, arranging the light emitting units in a plane filling pattern for covering at least a substantial portion of a surface, and electrically interconnecting the light emitting units through the connection areas thereof, particularly realizing an arrangement in which at least one of the connection areas of individual light emitting units is electrically connected simultaneously to respective connection areas of at least two other light emitting units, i.e. is involved in a combined connection. As explained earlier, the number of light emitting units involved in a combined connection may be any practical number higher than two.

The light emitting units are arranged in a partially overlapping fashion, wherein the light emitting units are particularly made to overlap at the positions of at least portions of the connection areas where individual light emitting units are to be involved in a combined connection. It is practical if light emitting units comprising at least one recessed portion are provided, wherein at least one connection area of the light emitting units comprises at least one electrically conductive member that is arranged on the light emitting units at the position of their at least one recessed portion, and that is in electrical connection with the internal electrical circuit of the light emitting units, and wherein arranging the light emitting units in a partially overlapping fashion involves making the light emitting units partially overlap at the positions of their recessed portions.

Further, in conformity with the above explanation of the various options relating to the light emitting device according to the invention, at least the following options are available in the context of the method:

(1a) providing light emitting units having a periphery with a number of sides and corners interconnecting the sides, and making combined connections at corner positions on the light emitting units, (1b) providing light emitting units having a generally quadrilateral periphery, and making combined connections at opposite corner positions on the light emitting units, (2a) arranging the light emitting units in a regular pattern comprising rows and columns, and making combined connections of four light emitting units at positions where four light emitting units meet, i.e. nodal positions both between two rows and between two columns, and (2b) in the case of the previous option (2a), providing combined connections at every other nodal position only, both in the direction of the rows and the direction of the columns of the pattern.

It is to be noted that the concept of arranging light emitting units in a partially overlapping fashion is independent of the concept of providing combined connections between at least three light emitting units. Hence, in a second aspect and as defined in the claims, the invention relates to a light emitting device, comprising light emitting units being arranged in a plane filling pattern for covering at least a substantial portion of a surface, wherein individual light emitting units comprise an internal electrical circuit and at least two connection areas providing electrical access to the internal electrical circuit from outside of the light emitting units, wherein the light emitting units are electrically interconnected through the connection areas thereof, and wherein the light emitting units overlap at the positions of at least portions of the connection areas thereof. In particular, individual light emitting units may comprise at least two recessed portions, wherein the connection areas of the light emitting units comprise at least one electrically conductive member that is arranged on the light emitting units at the position of their at least two recessed portions, and that is in contact with the internal electrical circuit of the light emitting units, and wherein the light emitting units partially overlap at the positions of their at least two recessed portions.

Many of the options discussed in the foregoing in the context of the combined connections are equally applicable to the light emitting device as now defined with an emphasis on the partially overlapping arrangement of the light emitting units. In particular, it may be so that the light emitting units have a periphery with a number of sides and corners interconnecting the sides, wherein at least one of the connection areas of the light emitting units is located at a corner position on the light emitting units. In case the light emitting units have a generally quadrilateral periphery, the light emitting units may comprise two connection areas that are located at opposite corner positions on the light emitting units. Further, individual light emitting units may comprise at least one light source that is configured to emit anti-fouling light during operation thereof and/or the light emitting device may comprise a single electric power source that is configured to power all of the light emitting units.

The light emitting device as now defined may be part of an assembly further comprising a marine object, the marine object comprising at least one surface that is intended to be at least partially submersed in a fouling liquid containing biofouling organisms during at least a part of the lifetime of the marine object, and the light emitting device being arranged on the at least one surface.

The invention further relates to a method for assembling a light emitting device, comprising the steps of providing light emitting units comprising an internal electrical circuit and at least two connection areas providing electrical access to the internal electrical circuit from outside of the light emitting units, arranging the light emitting units in a plane filling pattern for covering at least a substantial portion of a surface, and electrically interconnecting the light emitting units through the connection areas thereof, wherein the light emitting units are made to overlap at the positions of at least portions of the connection areas thereof. As explained earlier, it may be so that individual light emitting units comprise at least two recessed portions, wherein the connection areas of the light emitting units comprise at least one electrically conductive connection member that is arranged on the light emitting units at the position of their at least two recessed portions, and that is in electrical connection with the internal electrical circuit of the light emitting units. In that case, the method may comprise a step of making the light emitting units partially overlap at the positions of their at least two recessed portions.

The concept of arranging light emitting units in a partially overlapping fashion does not necessarily need to be limited to arranging the light emitting units in a plane filling pattern for covering at least a substantial portion of a surface. Hence, the invention further relates to a light emitting device, comprising light emitting units being arranged in a pattern, wherein individual light emitting units comprise an internal electrical circuit and at least two connection areas providing electrical access to the internal electrical circuit from outside of the light emitting units, wherein the light emitting units are electrically interconnected through the connection areas thereof, and wherein the light emitting units overlap at the positions of at least portions of the connection areas thereof. The options mentioned in the preceding paragraphs in respect of the light emitting device that is the subject of those paragraphs are equally applicable.

Also, the invention relates to a method for assembling a light emitting device, comprising the steps of providing light emitting units comprising an internal electrical circuit and at least two connection areas providing electrical access to the internal electrical circuit from outside of the light emitting units, arranging the light emitting units in a pattern, and electrically interconnecting the light emitting units through the connection areas thereof, wherein the light emitting units are made to overlap at the positions of at least portions of the connection areas thereof. The above-mentioned option of the light emitting units being provided with at least two recessed portions is equally applicable.

BRIEF DESCRIPTION OF THE DRAWINGS

The invention will now be explained in greater detail with reference to the figures, in which equal or similar parts are indicated by the same reference signs, and in which.

DETAILED DESCRIPTION OF THE EMBODIMENTS

Figure 1:
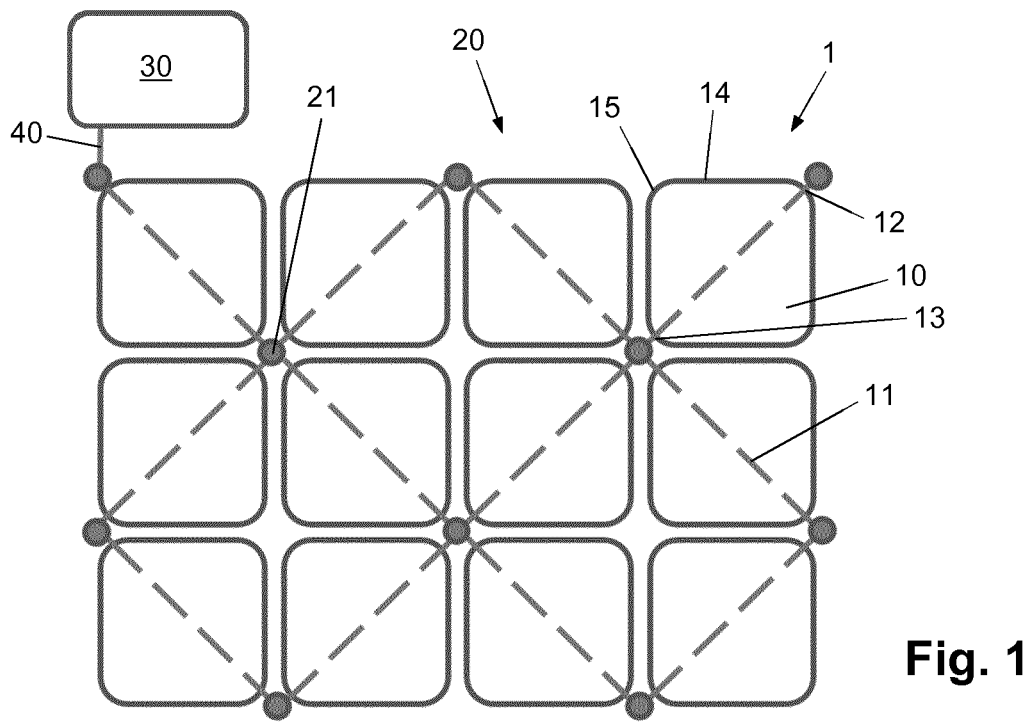
FIG. 1 diagrammatically shows a number of light emitting units of a light emitting device according to a first embodiment of the invention, and also an electric power source of the light emitting device.

FIG. 1 relates to a light emitting device 1 according to a first embodiment of the invention, comprising light emitting units 10 being arranged in a plane filling pattern 20, so that the light emitting device 1 is suitable to be used for covering at least a substantial portion of a surface. The light emitting units 10 are generally shaped like a tile, panel or the like, and comprise an internal electrical circuit 11 as diagrammatically indicated by means of dashed lines crossing the light emitting units 10. Also, in the shown embodiment, the light emitting units 10 comprise two connection areas 12, 13 providing electrical access to the internal electrical circuit 11 from outside of the light emitting units 10. The internal electrical circuit 11 may be configured in any appropriate way. For example, it may be so that the light emitting units 10 are equipped with at least one light source, and that the internal electrical circuit 11 comprises a plus wire and a minus wire for powering the at least one light source, wherein the at least one light source is arranged between the wires. Also, the connection areas 12, 13 may be configured in any appropriate way, as long as the function of providing a position where a light emitting unit 10 can be electrically interconnected to at least one other light emitting unit 10 is fulfilled. In this respect, it is noted that it is practical for the connection areas 12, 13 to comprise at least one electrically conductive member of some sort. In any case, in the light emitting device 1, the light emitting units 10 are electrically interconnected through the connection areas 12, 13 thereof.

Figure 5:
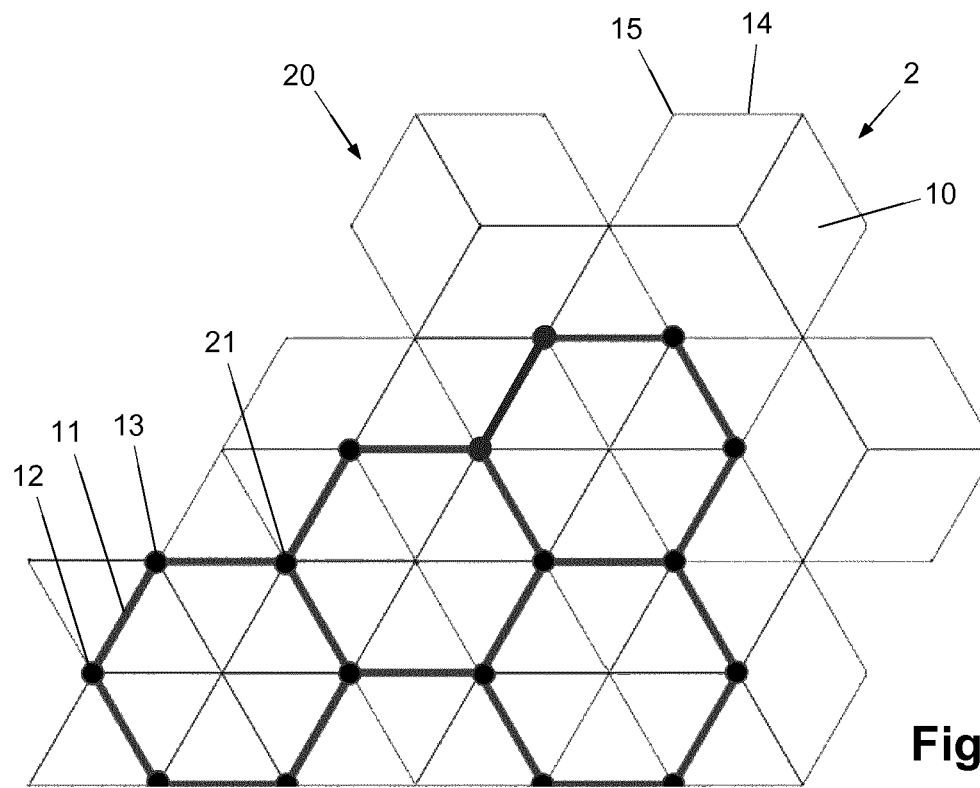
FIG. 5 diagrammatically shows a number of light emitting units of a light emitting device according to a second embodiment of the invention.
Figure 6:
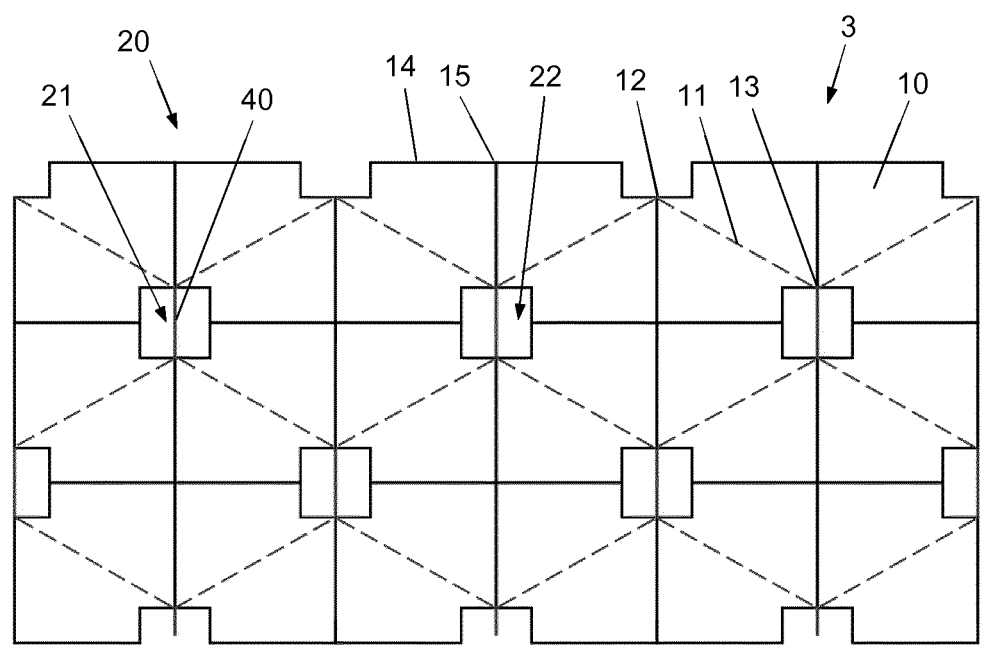
FIG. 6 diagrammatically shows a number of light emitting units of an alternative light emitting device.
Figure 7:
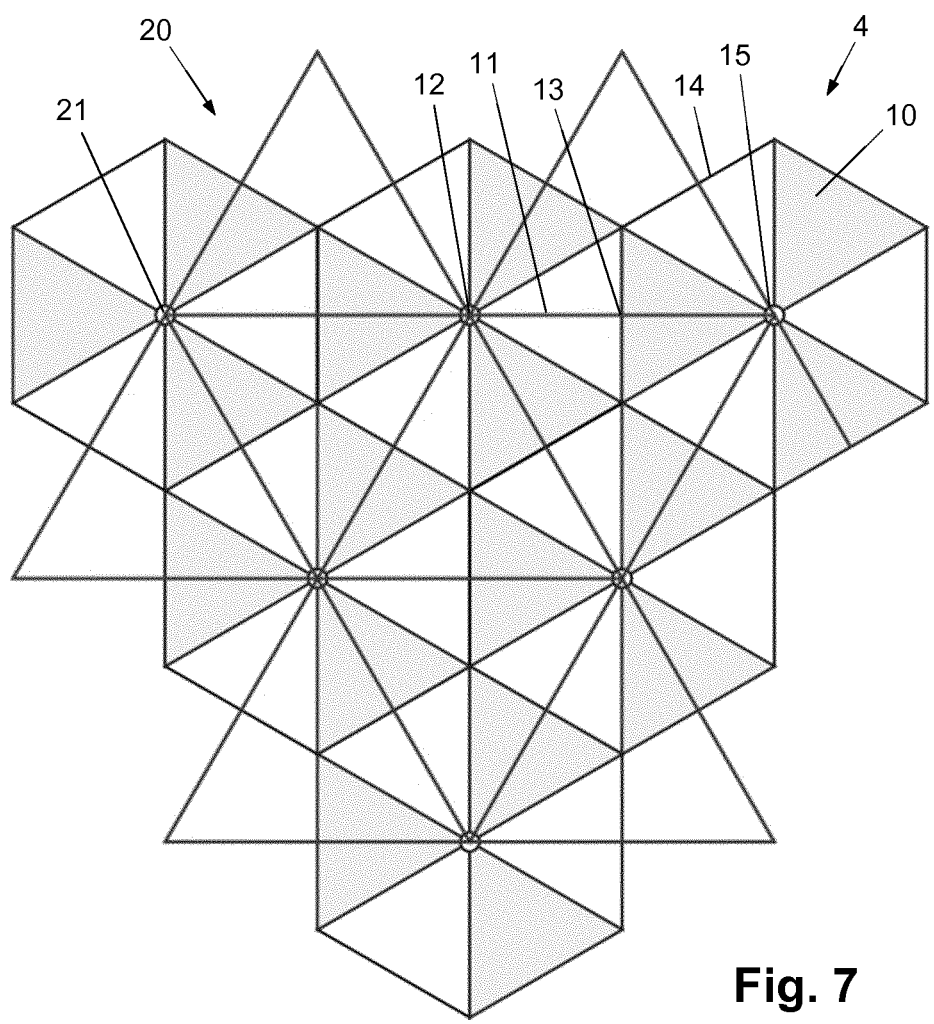
FIG. 7 diagrammatically shows a number of light emitting units of a light emitting device according to a third embodiment of the invention.

In the shown embodiment, the light emitting units 10 have a generally square periphery, wherein the light emitting units 10 have four sides 14 and four corners 15 interconnecting the sides 14. It is to be noted that this particular shape of the light emitting units 10 is shown for illustration purposes only, and that the present disclosure is not limited to such a shape in any way. Other possible shapes are shown in FIGS. 5-7, as will be explained later. FIG. 1 illustrates the option of providing the light emitting units 10 with rounded corners 15, which does not alter the fact that within the framework of the invention, the corners 15 may as well be sharp. Further, in the shown example, the pattern 20 of light emitting units 10 is of a regular character, the light emitting units 10 being arranged in columns and rows at a certain small mutual distance. These features of the pattern 20 are not essential; particularly, the light emitting units 10 may as well be arranged in an abutting fashion. As far as the positioning of the connection areas 12, 13 on the light emitting units 10 is concerned, it is noted that the connection areas 12, 13 are situated at two opposite corners 15 of the light emitting unit 10 in the shown example.

In FIG. 1, only a few of a total number of light emitting units 10 of the light emitting device 1 are shown. Within the framework of the invention, the light emitting device 1 may comprise any suitable number of light emitting units 10, wherein it is possible for the number of light emitting units 10 to be as high as 10,000, or even (far) more. The light emitting units 10 may have any suitable dimensions. In view of a practical possibility of using the light emitting device 1 for the purpose of covering a ship's hull and performing an anti-fouling action by emitting anti-fouling light in a direction away from the hull, an example of such dimensions are dimensions in the order of 1 m when it comes to a length of the sides 14 of the light emitting units 10.

The light emitting units 10 may be of any suitable design and may comprise any suitable components, depending on the intended use of the light emitting device 1. An example of intended use of the light emitting device 1 is use for the purpose of performing an anti-fouling action on surfaces, as mentioned, wherein it is advantageous if the device 1 is designed to emit ultraviolet light during operation thereof. In such a case, it may be practical for the device 1 to be designed to specifically emit ultraviolet light of the c type, which is also known as UVC light, and even more specifically, light with a wavelength roughly between 250 nm and 300 nm. It has been found that most fouling organisms are killed, rendered inactive, or rendered unable to reproduce by exposing them to a certain dose of ultraviolet light having such characteristics. The light may be applied continuously or at a suitable frequency, whatever is appropriate in a given situation, especially at a given light intensity. Also, in such a case, it may be practical for the light emitting units 10 to comprise silicone material.

In general, the light emitting units 10 may comprise at least one light source (not shown) for emitting the light that is envisaged, and further an internal electric track and/or internal electric wiring as part of the internal electrical circuit 11, to which the at least one light source is connected. For the purpose of powering the at least one light source of the light emitting units 10, the light emitting device 1 comprises an electric power source 30, and the light emitting units 10, particularly the internal electrical circuit 11 thereof, are connected to that power source 30. As mentioned in the foregoing, the light emitting units 10 are electrically interconnected through the connection areas 12, 13 thereof. The light emitting device 1 comprises at least one electrically conductive element 40 for electrically interconnecting at least one of the light emitting units 10 and the power source 30. As the other light emitting units 10 are electrically connected to the at least one of the light emitting units 10 that is directly connected to the power source 30, all other light emitting units 10 are indirectly connected to the power source 30 as well, so that only one power source 30 is needed for powering a large number of light emitting units 10.

In the light emitting device 1 shown in FIG. 1, electrical connections are provided between four light emitting units 10 at one position. In the present text, in view of the fact that the electrical connections involve more than a conventional number of two light emitting units 10, the electrical connections are referred to as combined connections. Positions where the combined connections are provided are positions where four light emitting units 10 meet, i.e. positions both between two rows and between two columns, which will hereinafter be referred to as nodal positions 21. Not all nodal positions 21 between the light emitting units 10 as present in the pattern 20 are positions where four light emitting units 10 are interconnected. The combined connections are only provided at the nodal positions 21 where connection areas 12, 13 of four light emitting units 10 come together. As a consequence, in the shown example, the combined connections are provided at every other nodal position 21, both in the direction of the rows and the direction of the columns of the pattern 20.

The combined connections between four light emitting units 10 at respective nodal positions 21 can be realized in any suitable way. In the first place, it is possible to have at least one actual conductive element interconnecting the connection areas 12, 13 of the respective light emitting units 10. Such an electrically conductive element may be provided as wiring, but other possibilities exist within the framework of the invention as well, including a possibility of the electrically conductive element being provided as a bump or track of an electrically conductive material. In the case of wiring, it may be practical for the wiring to be of the twin type, providing a plus wire and a minus wire for powering the at least one light source of the light emitting units 10, although it is also possible to have separate plus wires and minus wires. Assuming that separate plus and minus wires are used in a light emitting unit 10, those wires may be arranged so as to extend more or less in a parallel configuration through the light emitting unit 10, in which case the wires may extend between the same connection areas 12, 13 of the light emitting unit 10 so that the number of connection areas 12, 13 of the light emitting unit 10 can remain as low as possible. This is however not essential within the framework of the invention. For example, it is also possible to have a cross-like configuration of the wires, in which the plus wire extends between two other connection areas 12, 13 of the light emitting unit 10 than the minus wire.

If the light emitting device 1 is intended to be used underwater, it is practical if measures are taken for having a liquid-tight seal at the positions where the electrically conductive elements are connected to the light emitting units 10, i.e. the positions where electric wires enter/exit the light emitting units 10 in case the electrically conductive elements are provided as wiring. The electrically conductive elements arranged at a nodal position 21 between four light emitting units 10 may comprise a wire assembly of two electric wires in a crosswise arrangement, for example, wherein the electric wires are electrically connected to each other at the cross-over position, and wherein each of the light emitting units 10 is connected to a respective wire end of the wire assembly, which does not alter the fact that other embodiments of those electrically conductive elements are also feasible. A practical alternative to using wiring for electrically interconnecting the light emitting units 10 will be explained later on the basis of FIGS. 9-21.

By providing combined connections between the light emitting units 10, it is achieved that the number of physical connections between the light emitting units 10 can be kept to a minimum while at the same time maintaining an acceptable level of electrical redundancy in the light emitting device 1. In the case as illustrated in FIG. 1, compared to a conventional situation in which each connection is only between two light emitting units 10, it is achieved that the total number of connections between light emitting units 10 in the light emitting device 1 can be reduced by roughly 50% while still having the same level of electrical redundancy, so that it is guaranteed that each of the light emitting units 10 is at a position for receiving power through alternative connection routes, as a result of which failure of a light emitting unit 10 or a connection to a light emitting unit 10 does not affect the functioning of the other light emitting units 10. In other words, it is possible to have quite a number of failing light emitting units 10 and/or failing connections to light emitting units 10 and still have a maximum number of operative light emitting units 10. The fact is that in the light emitting device 1, individual light emitting units 10 can be reached by electric power at two positions on the light emitting unit 10, namely at two opposite corner positions. When one of the connections to a light emitting unit 10 fails, the light emitting unit 10 can still be powered through an alternative route. In FIG. 1, the routing of the electric power through the pattern 20 of light emitting units 10 is through the internal electrical circuit 11 of the respective light emitting units 10 and the combined connections between the light emitting units 10 at nodal positions 21 in the pattern 20. In general, it is to be noted that in the light emitting device 1, the power is provided through a grid-shaped routing structure offering many different alternative routes.

Figure 2:
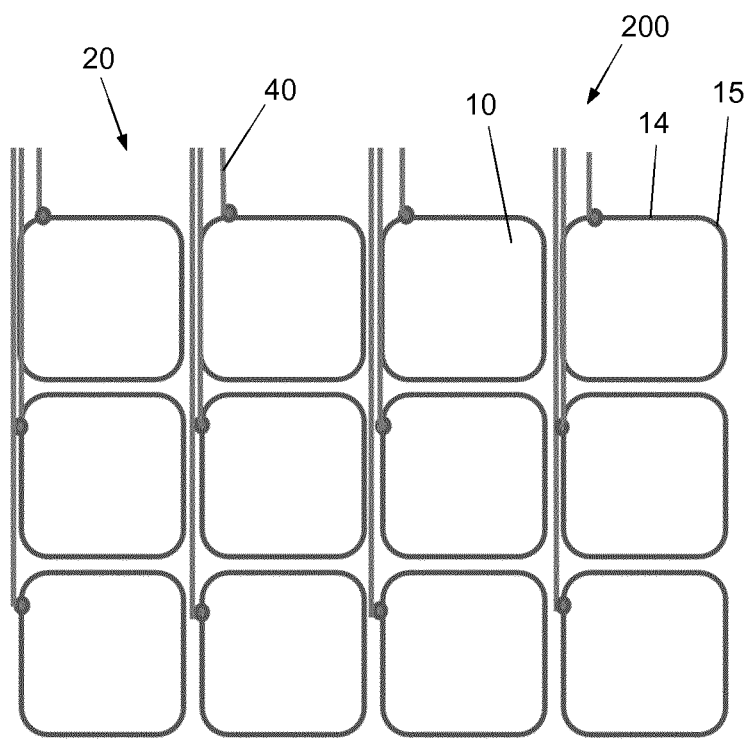
FIG. 2 diagrammatically shows a number of light emitting units of a first conventional light emitting device.
Figure 3:
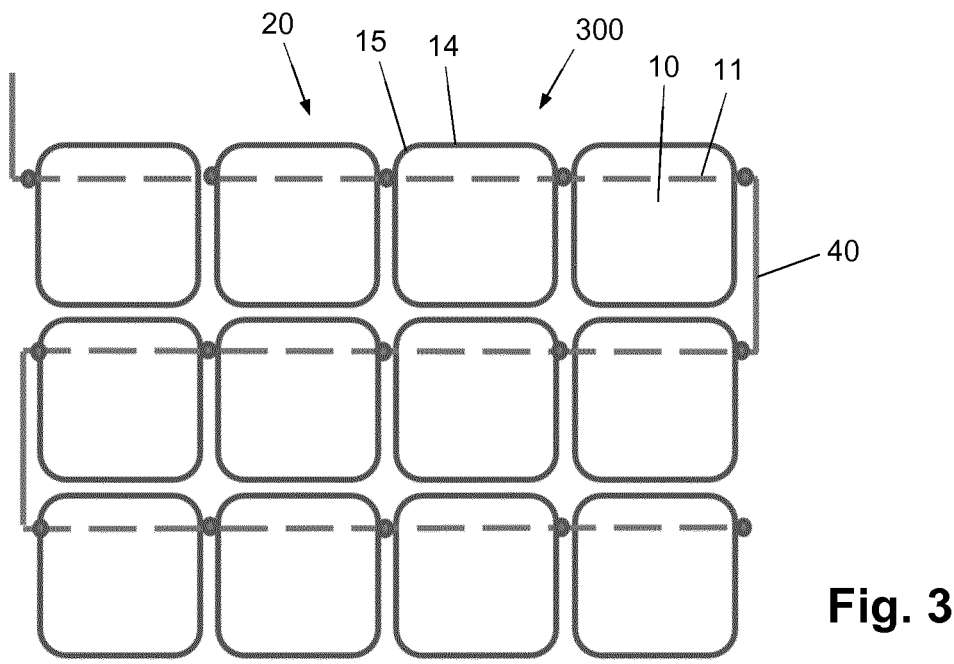
FIG. 3 diagrammatically shows a number of light emitting units of a second conventional light emitting device.
Figure 4:
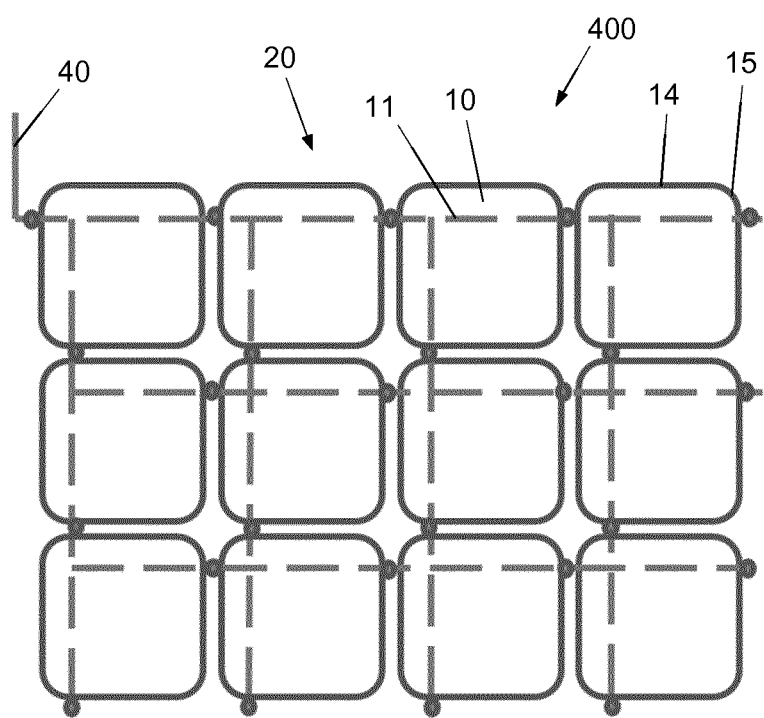
FIG. 4 diagrammatically shows a number of light emitting units of a third conventional light emitting device.

The suggestion that the amount of connections between light emitting unit 10 can be kept to a minimum, while still an acceptable level of electrical redundancy is maintained, can be further understood by making a comparison between the light emitting device 1 as shown in FIG. 1 and respective conventional light emitting devices 200, 300, 400 as shown in FIGS. 2, 3 and 4.

In FIG. 2, a conventional light emitting device 200 is shown in which every light emitting unit 10 is individually connected to an electric power source 30 (not shown in FIG. 2) through an electrically conductive element 40 in the form of an electric wire. In this layout, when a connection to one of the light emitting units 10 fails, that particular unit 10 cannot be powered through an alternative route and is no longer useful. On the other hand, the power supply to the other light emitting units 10 is not affected. However, it takes a large amount of electric wires to achieve this level of electrical redundancy, wherein most of those electric wires need to cover relatively large distances and are extra susceptible to damage as a result thereof.

In FIG. 3, a conventional light emitting device 300 is shown in which the light emitting units 10 are connected in daisy chain fashion, wherein the light emitting units 10 are electrically connected one after another, and wherein connections need to be made at two sides of each of the light emitting units 10. In conformity with FIG. 1, the internal electrical circuits 11 of the respective light emitting units 10 are diagrammatically indicated by means of dashed lines in FIG. 3, thereby indicating how the electric power is routed through the pattern 20 of light emitting units 10. The layout shown in FIG. 3 is extremely vulnerable to damage. The fact is that if one light emitting unit 10 or connection to a light emitting unit 10 fails, all of the light emitting units 10 further down the daisy chain cannot be supplied with power.

In FIG. 4, a conventional light emitting device 400 is shown in which the level of electrical redundancy is improved in comparison to the option of daisy chaining the light emitting units 10 as illustrated in FIG. 3. However, this is at the cost of an increase of the number of electrical connections that are necessary. As can be seen in FIG. 4, individual light emitting units 10 that are at an edge position of the light emitting device 400 are connected to three other light emitting units 10, with the exception of a light emitting unit 10 that is at a corner position of the light emitting device 400, and individual light emitting units 10 that are not at an edge position of the light emitting device 400 are connected to four other light emitting units 10. Particularly, connections between two adjacent light emitting units 10 are provided at a position where sides 14 of the light emitting units 10 face each other. By making electrical connections between light emitting units 10 at nodal positions 21 between as many as four light emitting units 10, rather than at positions between sides 14 of only two light emitting units 10, the same level of electrical redundancy can be realized while reducing the amount of connections between light emitting units 10 by 50%.

In conformity with FIG. 1, the internal electrical circuits 11 of the respective light emitting units 10 are diagrammatically indicated by means of dashed lines in FIG. 4, thereby indicating how the electric power is routed through the pattern 20 of light emitting units 10. In the layout shown in FIG. 1, the routing of the electric power is still grid-shaped, with square basic elements, as is the case in the conventional option illustrated in FIG. 4, which is a further explanation as to why it is possible to have the same level of electrical redundancy. The difference is that in the layout shown in FIG. 1, the routing is through nodal positions 21 between the light emitting units 10 and is thereby tilted over an angle of 45° with respect to a conventional routing through the sides 14 of the light emitting units 10.

FIG. 5 relates to a light emitting device 2 according to a second embodiment of the invention. In this light emitting device 2, the light emitting units 10 are diamond-shaped, and combined connections are provided between three light emitting units 10. The light emitting units 10 are shown as being arranged in an abutting fashion, whereas in practical cases, the light emitting units 10 may be arranged with some space between the sides 14 thereof.

As is the case with the configuration shown in FIG. 1, the light emitting units 10 do not need to comprise more than two connection areas 12, 13, wherein the connection areas 12, 13 are located at opposite corner positions on the light emitting units 10, although the latter is not essential. FIG. 5 further illustrates the fact that the electric routing through the light emitting device 2 can be depicted as a grid comprising hexagonal basic elements, wherein, in a number of light emitting units 10, the two connection areas 12, 13 of the light emitting units 10 are shown as being interconnected through a straight line crossing the light emitting units 10 from one connection area 12 to the other connection area 13, representing the internal electrical circuit 11 of the light emitting units 10. Thus, the electrical redundancy is at a level as desired, wherein a light emitting unit 10 can still be used when a connection to that light emitting unit 10 fails, and the functioning of the other light emitting units 10 is not affected either, while the number of connections to each of the light emitting units 10 is minimal.

FIG. 6 relates to an alternative light emitting device 3. In this light emitting device 3, the light emitting units 10 are generally square-shaped, having a cut-out at two opposite corner positions, and a connection area 12, 13 at each of the cut-outs. The light emitting units 10 are shown as being arranged in an abutting fashion, which does not alter the fact that the light emitting units 10 may be arranged with some space between the sides 14 thereof. In the pattern 20, the light emitting units 10 are arranged such that square spaces 22 are obtained between the light emitting units 10 at the position of the cut-outs of the light emitting units 10. Four light emitting units 10 are electrically interconnected at the position of the spaces 22. In particular, the spaces 22 may be used for accommodating electrically conductive elements 40 such as electric wires as may be used for electrically interconnecting four light emitting units 10.

In fact, the alternative light emitting device 3 resembles the light emitting device 1 according to the first embodiment of the invention to a large extent, a difference pertaining to the shape of the light emitting units 10 at the opposite corner positions where the connection areas 12, 13 of the light emitting units 10 are located. On the basis of the fact that the light emitting units 10 are provided with cut-outs, it is possible, but not necessary, to arrange the light emitting units 10 in a closely adjoining fashion and still have sufficient room for accommodating electrically conductive elements 40 between the light emitting units 10, namely at the positions of the square spaces 22. According to one possibility existing within the context of the alternative light emitting device 3, such electrically conductive elements 40 may comprise a length of electric wire having split ends for connection to two light emitting units 10 at each of the ends. In FIG. 6, this possibility is diagrammatically depicted, whereas, in conformity with FIG. 1, the way in which the connection areas 12, 13 of the light emitting units 10 are electrically interconnected through the internal electrical circuit 11 of the light emitting units 10 is indicated by means of dashed lines, as a result of which the grid-like structure of the electric routing through the pattern 20 is clearly visible in FIG. 6.

FIG. 7 relates to a light emitting device 4 according to a third embodiment of the invention. In this light emitting device 4, the light emitting units 10 are triangular-shaped. It is noted that in FIG. 7, the light emitting units 10 are shown as being arranged in an abutting fashion, whereas in practical cases, the light emitting units 10 may be arranged with some space between the sides 14 thereof.

The pattern 20 shown in FIG. 7 is an example of a pattern 20 in which the light emitting units 10 are electrically interconnected both through conventional connections between two light emitting units 10 and through combined connections between more than two light emitting units 10, namely between as many as six light emitting units 10 in this particular case. In particular, each of the light emitting units 10 is connected to five other light emitting units 10 at a corner 15 thereof, and to one further light emitting unit 10 at a position on a side 14 opposite to the corner 15 as mentioned. The grid-like structure of the electric routing through the pattern 20 is also shown in FIG. 7, comprising triangular basic elements having sides extending between the positions of the combined connections. It is a fact that also in the layout shown in FIG. 7, each of the light emitting units 10 does not comprise more than two connection areas 12, 13, while sufficient electrical redundancy is still guaranteed through combined connections between more than two light emitting units 10, namely six light emitting units 10 in this particular case.

Figure 8:
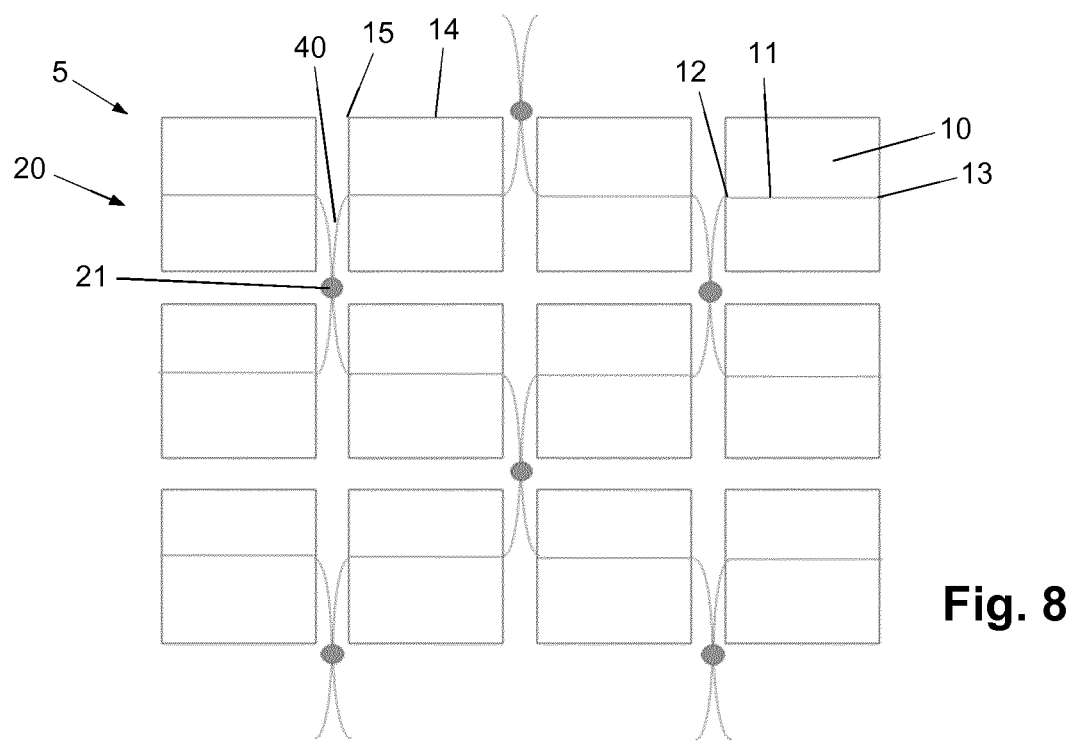
FIG. 8 diagrammatically shows a number of light emitting units of a light emitting device according to a fourth embodiment of the invention.

FIG. 8 relates to a light emitting device 5 according to a fourth embodiment of the invention. In this light emitting device 5, the light emitting units 10 are generally square-shaped. The light emitting units 10 are shown as being arranged at a short mutual distance, which does not alter the fact that the light emitting units 10 may as well be arranged in an abutting fashion.

In fact, the light emitting device 5 according to the fourth embodiment of the invention resembles the light emitting device 1 according to the first embodiment of the invention to a large extent, a difference pertaining to the positioning of the connection areas 12, 13 on the light emitting units 10. FIG. 8 serves to illustrate the fact that it is not necessary for the connection areas 12, 13 to be located at corner positions on the light emitting units 10, showing a pattern 20 of light emitting units 10 in which combined connections are provided between four light emitting units 10, in a similar manner as is the case in the light emitting device 1 according to the first embodiment of the invention, but in which light emitting units 10 are used that have their connection areas 12, 13 positioned at opposite sides 14 thereof. In this embodiment, it may be practical for the light emitting units 10 to be electrically interconnected through electric wiring or electrically conductive tracks, for example. In any case, this embodiment also has the feature of no more than two connection areas 12, 13 per light emitting unit 10 and an arrangement of combined connections at (or near) every other nodal position 21 only, while still having the same level of electrical redundancy as the conventional option illustrated in FIG. 4 that needs twice as many connections. It is noted that in the case of generally square-shaped light emitting units 10, in which combined connections of four light emitting units 10 are provided, it appears to be sufficient for the number of combined connections to be 50% of the number of light emitting units 10.

Figure 16:
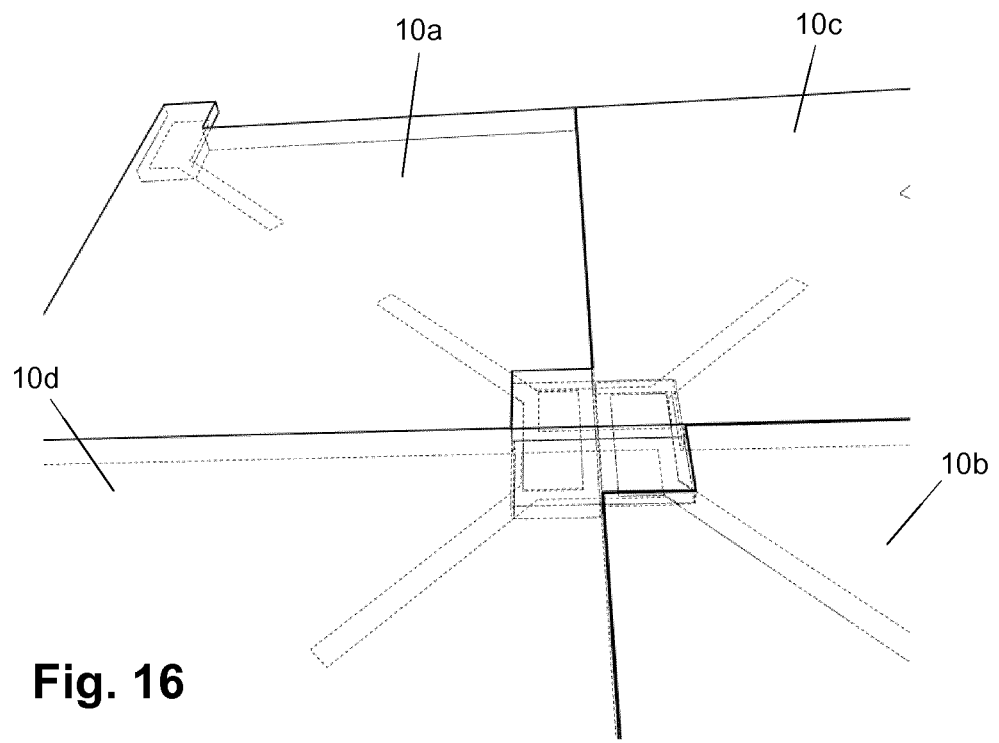
Figure 17:
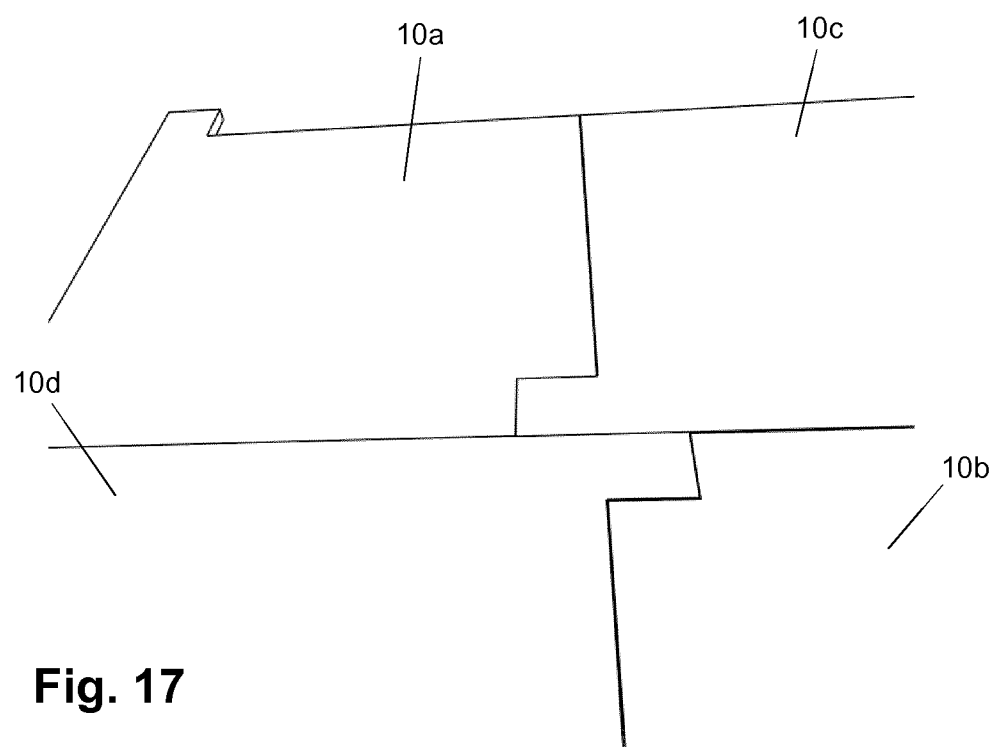
Figure 18:
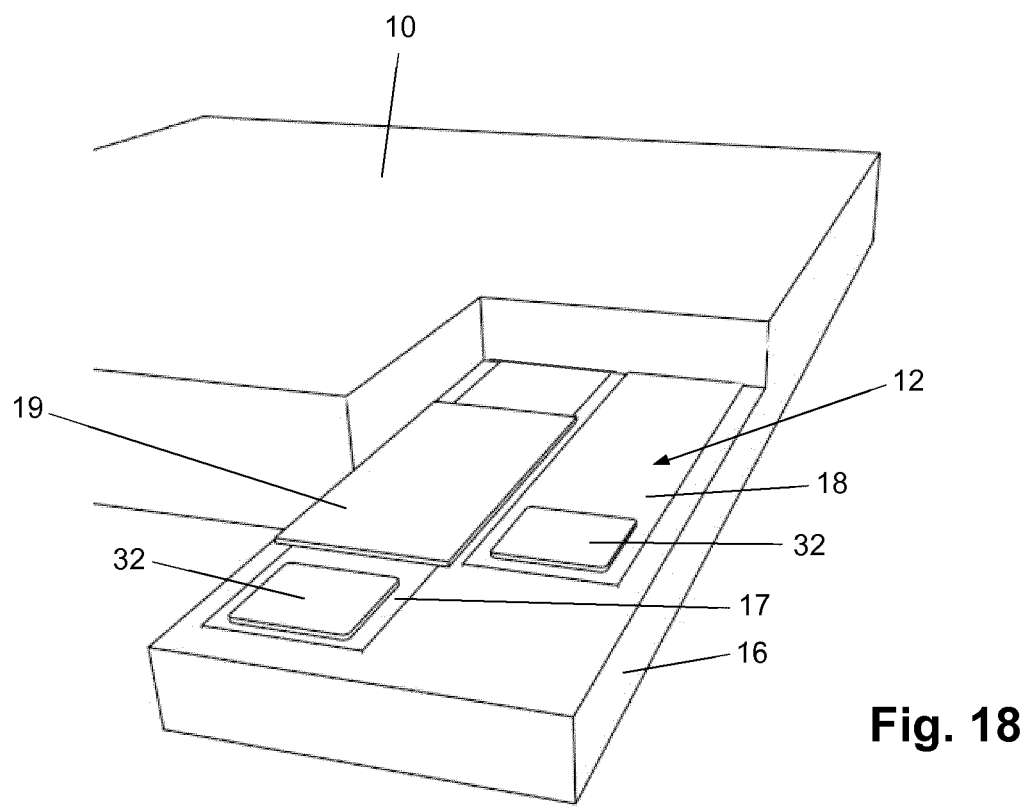
FIG. 18 illustrates an alternative configuration of a connection area on a recessed portion of a light emitting unit.

FIGS. 9-17 relate to a light emitting unit 10 having recessed portions 16 where connection areas 12, 13 of the light emitting unit 10 are located, and FIG. 18 relates to an alternative configuration of a connection area 12, 13 on a recessed portion 16 of a light emitting unit 10.

Figure 9:
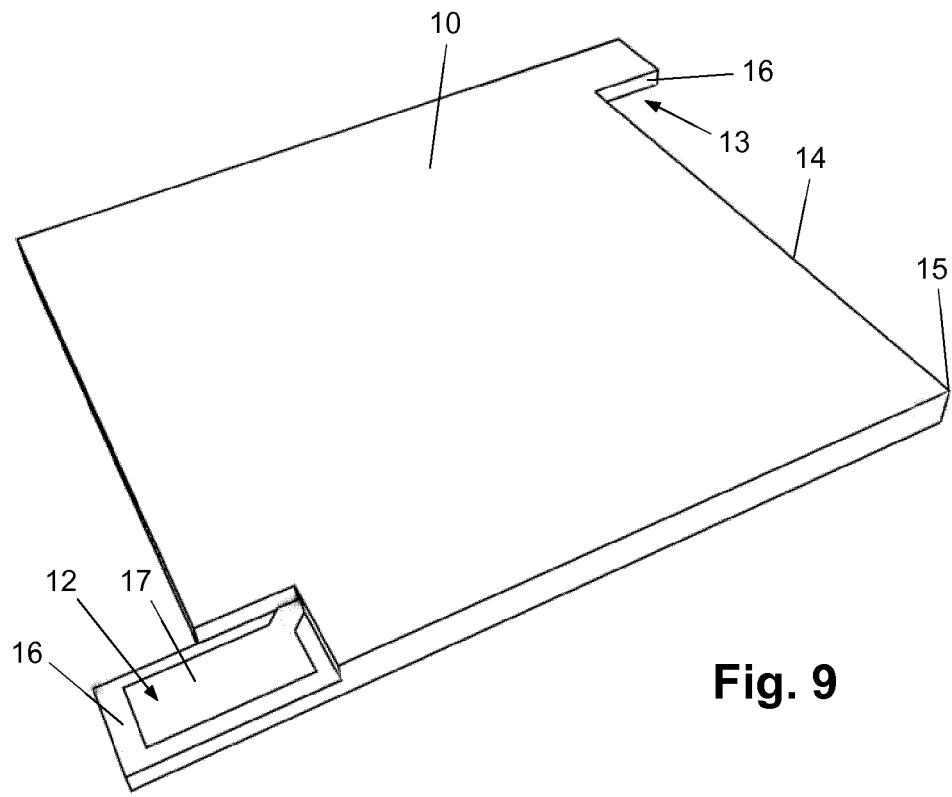
FIG. 9 diagrammatically shows a light emitting unit having recessed portions where connection areas of the light emitting unit are located.

In FIG. 9, a single light emitting unit 10 having a generally square periphery is shown. In this embodiment, the light emitting unit 10 has two recessed portions 16, located at two opposite corner positions on the light emitting unit 10. The connection areas 12, 13 are provided at the position of the recessed portions 16 in the form of an electrically conductive strip 17 that is in electrical connection with the internal electrical circuit 11 of the light emitting unit 10. The two recessed portions 16 are located at different levels, the electrically conductive strip 17 of one of the recessed portions 16 facing upward, and the electrically conductive strip 17 of the other of the recessed portions 16 facing downward. The recessed portions 16 partially extend from the generally square periphery of the light emitting unit 10 so as to enable a partially overlapping arrangement of the light emitting units 10 at the very positions of the recessed portions 16 thereof as will now be explained with reference to FIGS. 10-17, which serve to illustrate a process of putting four identical light emitting units 10a, 10b, 10c, 10d together for the purpose of making a combined connection between the light emitting units 10a, 10b, 10c, 10d.

Figure 10:
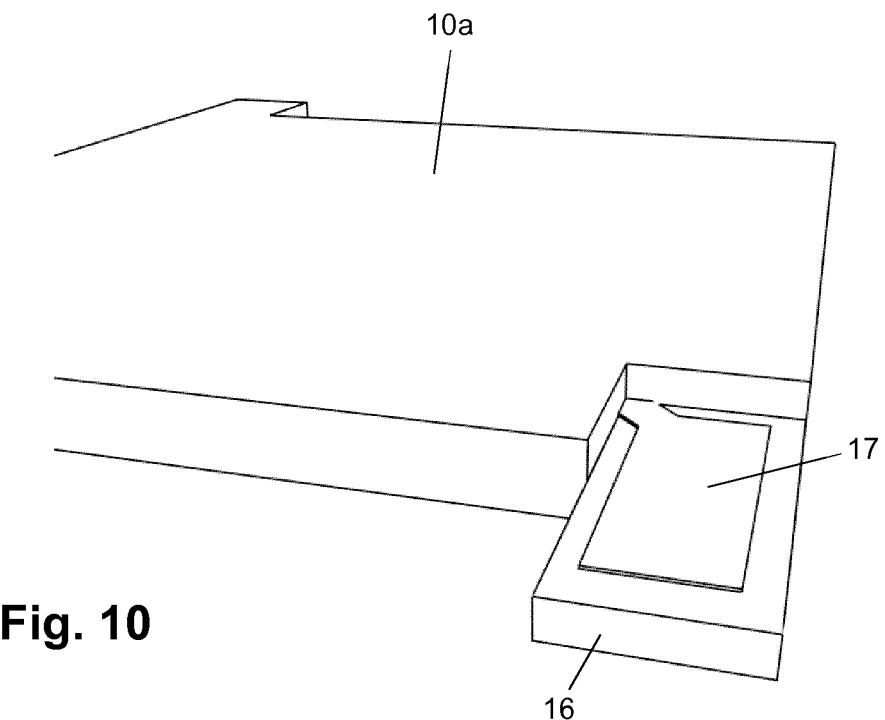
FIGS. 10-17 illustrate how four light emitting units as shown in FIG. 9 are put together for the purpose of making a combined connection between the light emitting units.

In FIG. 10, a first light emitting unit 10a is partially shown, with one of the recessed portions 16 extending forward as seen in the figure.

Figure 11:
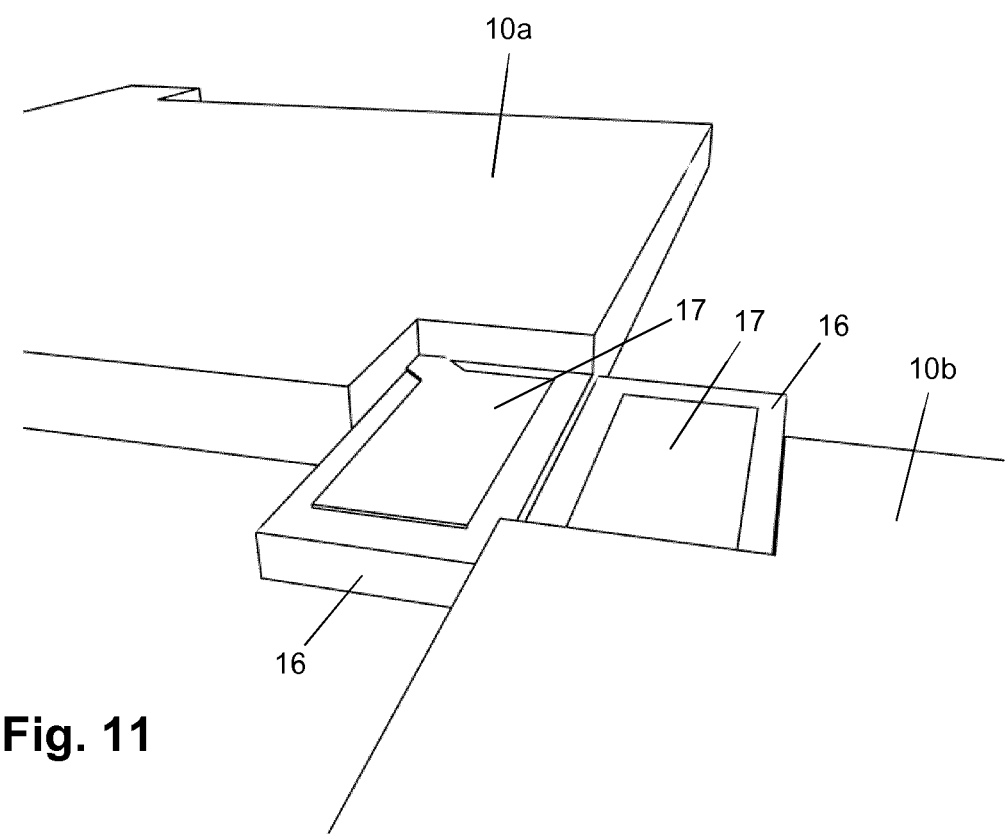

In FIG. 11, it is illustrated how a second light emitting unit 10b is positioned with respect to the first light emitting unit 10a, namely with a recessed portion 16 extending backward as seen in the figure, at a position beside the recessed portion 16 of the first light emitting unit 10a, wherein the electrically conductive strips 17 as present on the recessed portions 16 of the light emitting units 10a, 10b extend substantially parallel to each other.

Figure 12:
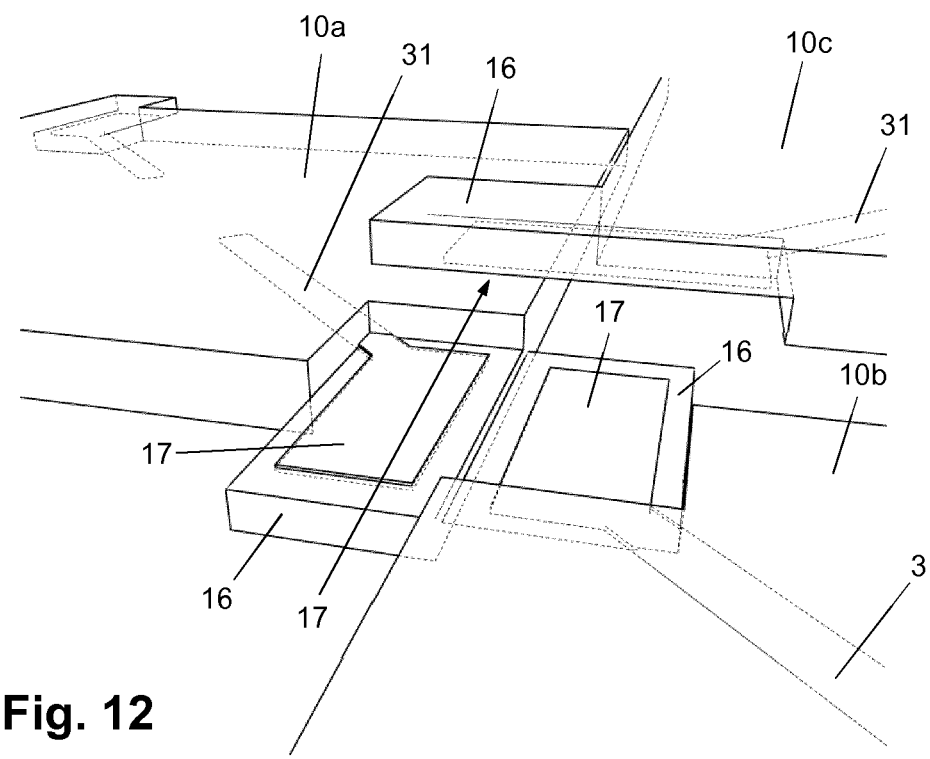
Figure 13:
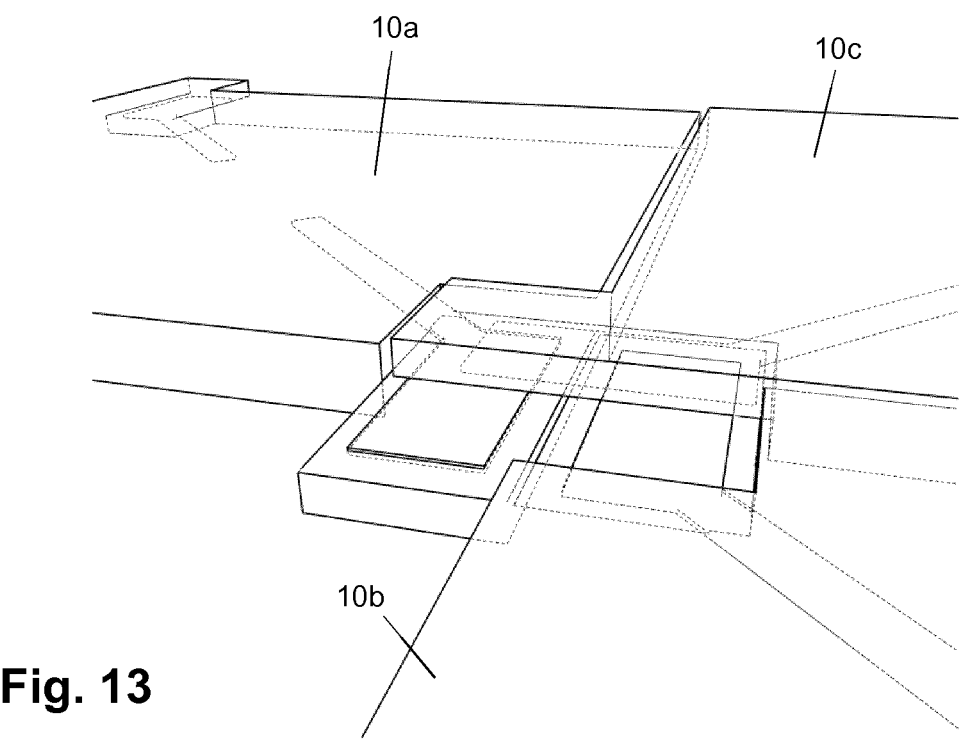

FIGS. 12 and 13 show how a third light emitting unit 10c is positioned with respect to both the first light emitting unit 10a and the second light emitting unit 10b, wherein it is noted that in these figures, hidden parts of the electrically conductive strips 17 and tracks 31 of the internal electrical circuit 11 of the light emitting units 10a, 10b, 10c, leading from the strips 17 to inside the light emitting units 10a, 10b, 10c, are indicated by means of dotted lines. FIG. 12 shows the third light emitting unit 10c approaching the first light emitting unit 10a and the second light emitting unit 10b, and FIG. 13 shows the third 1 light emitting unit 10c (almost) in place with respect to the first light emitting unit 10a and the second light emitting unit 10b.

With respect to the recessed portions 16 of the first light emitting unit 10a and the second light emitting unit 10b, the recessed portion 16 of the third light emitting unit 10c is oriented upside down, with the electrically conductive strip 17 thereof extending at an angle of substantially 90° with respect to the respective strips 17 of the first light emitting unit 10a and the second light emitting unit 10b. As a result, it is achieved that the recessed portion 16 of the third light emitting unit 10c overlaps half of the respective recessed portions 16 of the first light emitting unit 10a and the second light emitting unit 10b, wherein the electrically conductive strip 17 of the third light emitting unit 10c faces the respective strips 17 of the first light emitting unit 10a and the second light emitting unit 10b, and wherein the portions of the light emitting units 10a, 10b, 10c outside of the recessed portions 16 extend in one and the same plane, so that a light emitting device having an even overall surface can be realized.

Figure 14:
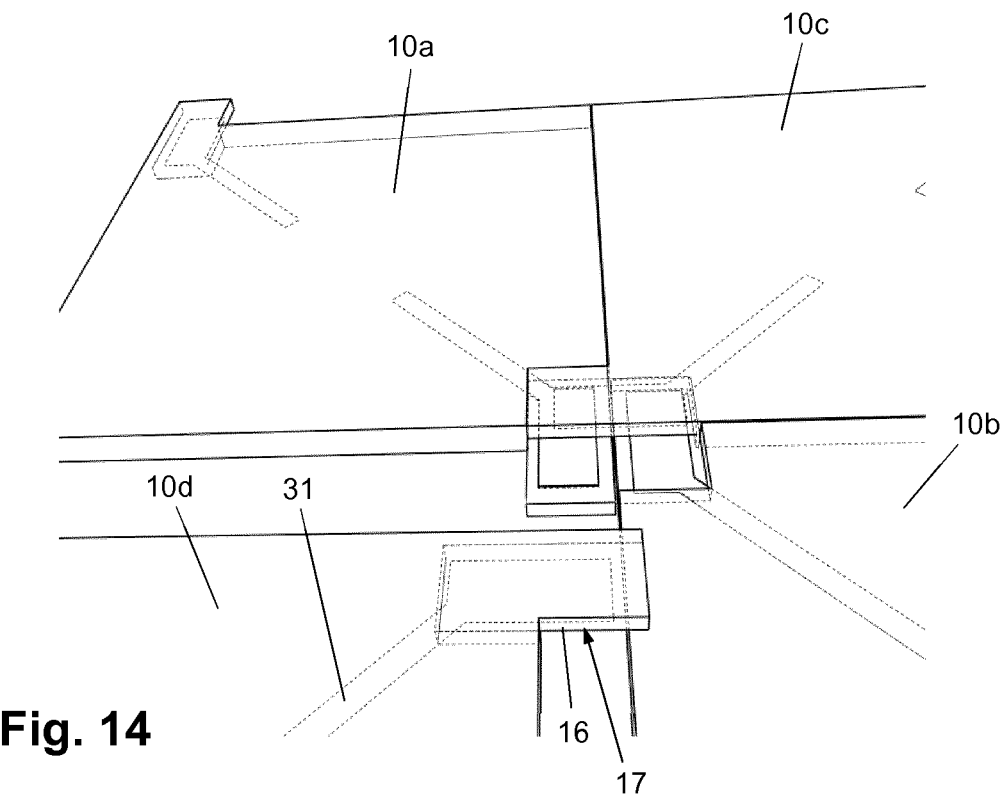
Figure 15:
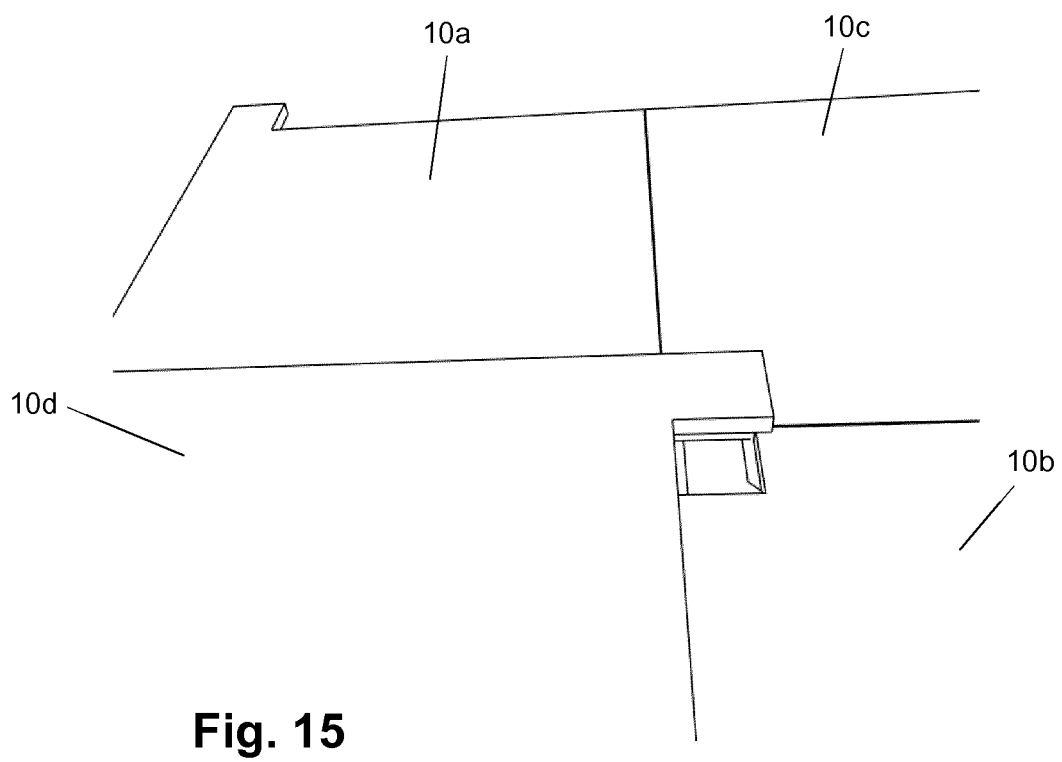

FIGS. 14-17 show how a fourth light emitting unit 10d is positioned with respect to the first light emitting unit 10a, the second light emitting unit 10b and the third light emitting unit 10c. FIGS. 14 and 15 show the fourth light emitting unit 10d approaching the first light emitting unit 10a, the second light emitting unit 10b and the third light emitting unit 10c, and FIGS. 16 and 17 show the fourth light emitting unit 10d in place with respect to the first light emitting unit 10a, the second light emitting unit 10b and the third light emitting unit 10c. In FIGS. 14 and 16, hidden parts of the electrically conductive strips 17 and the tracks 31 of the internal electrical circuit 11 of the light emitting units 10a, 10b, 10c, 10d are indicated by means of dotted lines, whereas FIGS. 15 and 17 illustrate the actual view on the light emitting units 10a, 10b, 10c, 10d.

As is the case with the recessed portion 16 of the third light emitting unit 10c, the recessed portion 16 of the fourth light emitting unit 10d is oriented upside down with respect to the recessed portions 16 of the first light emitting unit 10a and the second light emitting unit 10b, with the electrically conductive strip 17 thereof extending at an angle of substantially 90° with respect to the respective strips 17 of the first light emitting unit 10a and the second light emitting unit 10b, and extending substantially parallel to the strip 17 of the third light emitting unit 10c. In fact, a space that remains on the combination of the recessed portions 16 of the first light emitting unit 10a and the second light emitting unit 10b after the third light emitting unit 10c has been put in place, is filled and closed by means of the recessed portion 16 of the fourth light emitting unit 10d, wherein the fourth light emitting unit 10d is made to approach from an opposite side than the third light emitting unit 10c.

By putting the four light emitting units 10a, 10b, 10c, 10d together in the way as described in the foregoing and as illustrated in FIGS. 10-17, it is achieved that the closed configuration as shown FIGS. 16 and 17 is obtained as an end result. In the process, the recessed portions 16 of the light emitting units 10a, 10b, 10c, 10d are made to overlap, in such orientations that a crosswise configuration of two substantially parallel electrically conductive strips 17 at a bottom level and two substantially parallel electrically conductive strips 17 at a top level is obtained, the strips 17 of the two levels facing each other. In this way, a combined connection of the four light emitting units 10a, 10b, 10c, 10d is realized. In the shown example, the recessed portions 16 of the light emitting units 10a, 10b, 10c, 10d are about half as high as the larger portions of the light emitting units 10a, 10b, 10c, 10d, i.e. the portions of the light emitting units 10a, 10b, 10c, 10d outside of the recessed portions 16, so that a light emitting device having an even overall surface is realized, as mentioned earlier.

In the combined connection of the four light emitting units 10a, 10b, 10c, 10d, the electrically conductive strip 17 of the first light emitting unit 10a faces parts of the strips 17 of the third light emitting unit 10c and the fourth light emitting unit 10d, and is associated with the strip 17 of the second light emitting unit 10b through the strips 17 of the third light emitting unit 10c and the fourth light emitting unit 10d. Likewise, the electrically conductive strip 17 of the second light emitting unit 10b faces parts of the strips 17 of the third light emitting unit 10c and the fourth light emitting unit 10d, and is associated with the strip 17 of the first light emitting unit 10a through the strips 17 of the third light emitting unit 10c and the fourth light emitting unit 10d, the electrically conductive strip 17 of the third light emitting unit 10c faces parts of the strips 17 of the first light emitting unit 10a and the second light emitting unit 10b, and is associated with the strip 17 of the fourth light emitting unit 10d through the strips 17 of the first light emitting unit 10a and the second light emitting unit 10b, and the electrically conductive strip 17 of the fourth light emitting unit 10d faces parts of the strips 17 of the first light emitting unit 10a and the second light emitting unit 10b, and is associated with the strip 17 of the third light emitting unit 10c through the strips 17 of the first light emitting unit 10a and the second light emitting unit 10b.

It may be so that the light emitting units 10a, 10b, 10c, 10d are designed such that all it takes for having an effective combined connection, through which an electrical interconnection of the light emitting units 10a, 10b, 10c, 10d is established, is putting the light emitting units 10a, 10b, 10c, 10d together in the way as described in the foregoing. This is the case when the electrically conductive strips 17 of the light emitting units 10a, 10b, 10c, 10d are made to contact each other in the process, or are made to extend sufficiently close to each other so that transfer of electric power between the light emitting units 10a, 10b, 10c, 10d can take place on the basis of capacitive effects, for example. On the other hand, it may be so that the process of putting the light emitting units 10a, 10b, 10c, 10d together is followed by an action of pressing the light emitting units 10a, 10b, 10c, 10d together at the position where their recessed portions 16 overlap, an action of supplying heat to that position, etc. Optionally, as an intermediate step, glue or solder may be added to the electrically conductive strips 17, etc.

It may be practical for the connection areas 12, 13 to comprise two electrically conductive strips 17, 18, wherein one of the strips 17, 18 is associated with a plus side of the internal electrical circuit 11, and wherein the other of the strips 17, 18 is associated with a minus side of the internal electrical circuit 11. FIG. 18 illustrates this option, particularly by showing a connection area 12 comprising two electrically conductive strips 17, 18, as arranged on a recessed portion 16 of a light emitting unit 10. The light emitting unit 10 in question is intended to be combined with four other identical light emitting units 10, in the same manner as described in the foregoing and illustrated in FIGS. 10-17, the difference following from the design of the connection areas 12, 13 being a realization of separate plus and minus circuits in the combined connections. In order to avoid interconnection of the plus and minus circuits, an electrically insulating cover plate 19 is arranged at an appropriate position on one of the electrically conductive strips 17, 18. Further, in the shown example, the electrically conductive strips 17, 18 are provided with solder areas 32 at ends thereof.

As explained, the option of having recessed portions 16 and connection areas 12, 13 located on the recessed portions 16 is advantageous in the context of realizing combined connections between at least three light emitting units 10. However, that does not imply that this option is limited to such a context. In particular, this option is also applicable in a conventional context of realizing connections between no more than two light emitting units 10. Further, it is to be noted that the option of having a design of the light emitting units 10 including recessed portions 16 is independent of the general shape of the light emitting units 10.

Within the framework of the invention, putting to practice the option of having recessed portions 16 and connection areas 12, 13 located on the recessed portions 16 may alternatively comprise a design of the light emitting units 10 that allows for making the combined connections by positioning all protruding portions of the light emitting units 10 involved in the combined connections beside each other, at the same level, and interconnecting the respective connection areas 12, 13 by means of an intermediate plate or the like having an electrical circuit that is made to contact all of the connection areas 12, 13, for example. In such a case, it is possible for the connection areas 12, 13 to be arranged on portions protruding from the general shape of light emitting units 10. Another possibility is that the light emitting units 10 are provided with recessed portions 16 that are located within the general shape of the light emitting units 10. This possibility is illustrated in FIGS. 19-21, as will now be explained.

Figure 19:
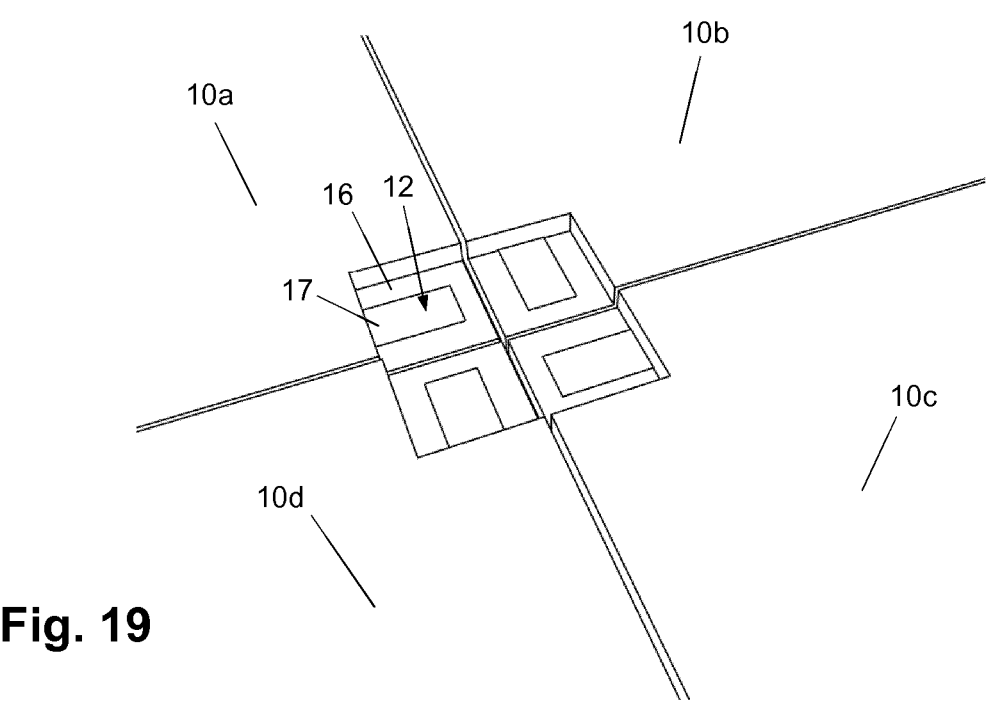
FIGS. 19-21 illustrate another option of putting four light emitting units together for the purpose of making a combined connection between the light emitting units, which involves application of an additional plate.

FIG. 19 shows corner portions of four light emitting units 10a, 10b, 10c, 10d, particularly corner portions where a recessed portion 16 is present on the respective light emitting units 10a, 10b, 10c, 10d. The four light emitting units 10a, 10b, 10c, 10d are arranged in such a way that the respective recessed portions 16 extend beside each other, at the same level, with a connection area 12 as present on the respective recessed portions 16 being accessible from one and the same side. In the present example, as is the case with the example shown in FIGS. 9-17, the connection area 12 of each of the light emitting units 10a, 10b, 10c, 10d is provided at the position of the recessed portion 16 of the respective light emitting unit 10a, 10b, 10c, 10d in the form of an electrically conductive strip 17 that is in electrical connection with the internal electrical circuit 11 of the light emitting unit 10a, 10b, 10c, 10d.

Figure 20:
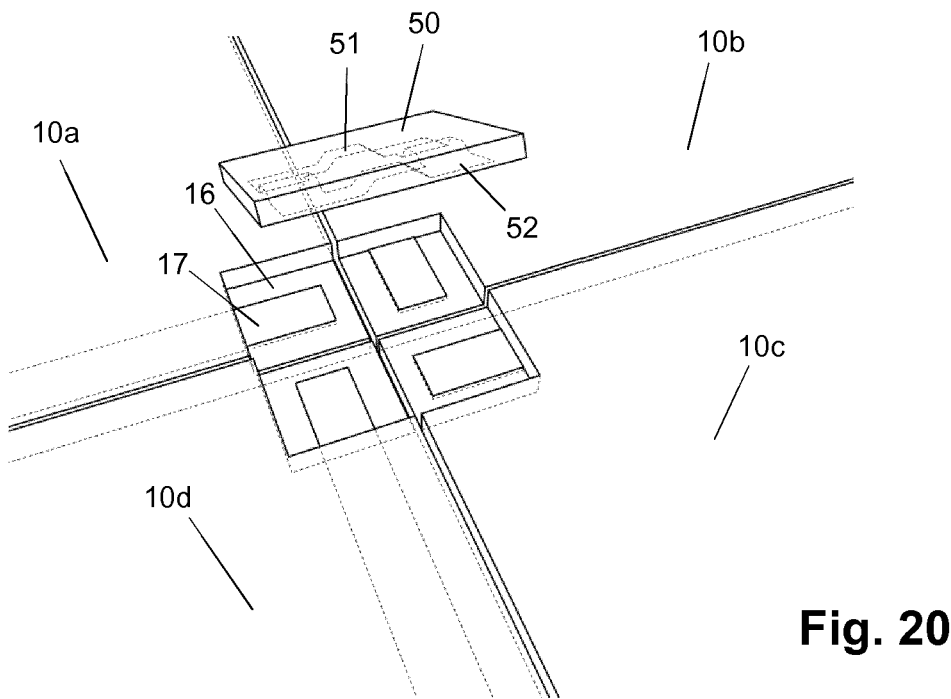
Figure 21:
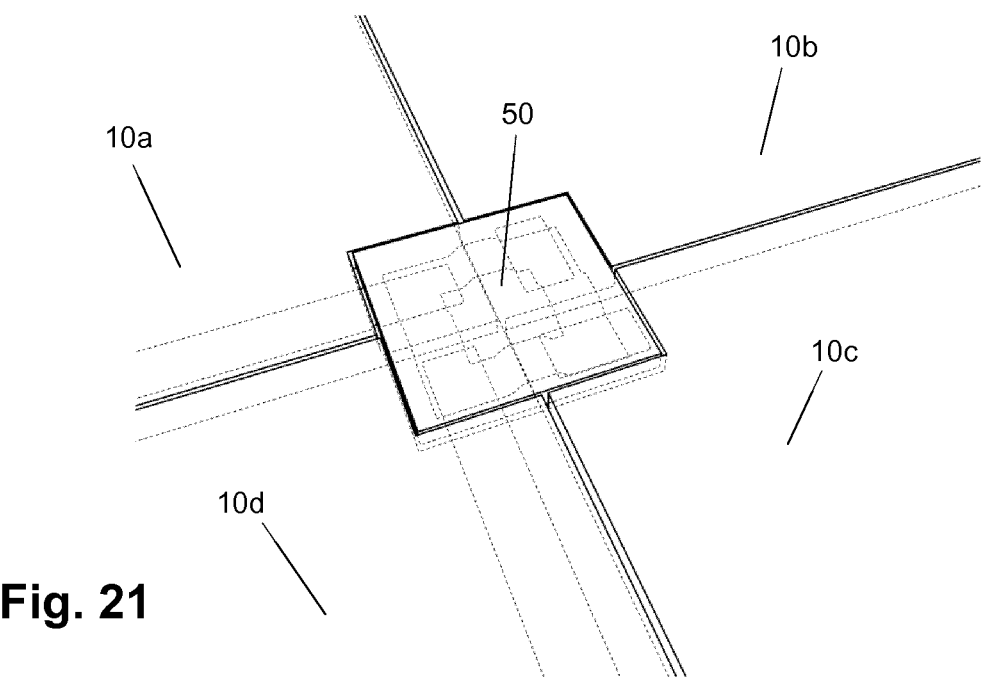

FIG. 20 illustrates how a plate 50 comprising an electrical circuit 51 that is accessible from the outside at the positions of four contacting pads 52 is made to approach a recessed area defined by the four recessed portions 16 of the respective light emitting units 10a, 10b, 10c, 10d. The plate 50 is put down on this recessed area, wherein each of the four contacting pads 52 are made to face or contact an electrically conductive strip 17 of another light emitting unit 10a, 10b, 10c, 10d, whereby a combined connection between the light emitting units 10a, 10b, 10c, 10d, in which the light emitting units 10a, 10b, 10c, 10d are electrically interconnected through the electrical circuit 51 of the plate 50, can be established. The final position of the plate 50 with respect to the light emitting units 10a, 10b, 10c, 10d is illustrated in FIG. 21. As shown, it may be practical if the dimensions of the plate 50 are chosen such that the plate 50 is capable of covering the entire recessed area, although this is not essential within the framework of the invention. Further, as shown, it may be practical if the dimensions of the plate 50 are chosen such that the plate 50 can be flush with the light emitting units 10a, 10b, 10c, 10d. In general, the dimensions of the plate 50 are preferably chosen such that the plate 50 exactly fits in the space that is present between the light emitting units 10a, 10b, 10c, 10d at the position of the recessed portions 16 thereof when the light emitting units 10a, 10b, 10c, 10d have been positioned with respect to each other in an appropriate way, as shown in FIG. 19.

In conformity with that which has already been explained in respect of the example as illustrated in FIGS. 9-17, it may be so that the light emitting units 10a, 10b, 10c, 10d and the plate 50 are designed such that all it takes for realizing an effective combined connection of the light emitting units 10a, 10b, 10c, 10d, is putting the light emitting units 10a, 10b, 10c, 10d and the plate 50 together in the way as described in the foregoing. This is the case when the contacting pads 52 of the plate 50 are made to contact the electrically conductive strips 17 of the light emitting units 10a, 10b, 10c, 10d in the process, or are made to extend sufficiently close to the electrically conductive strips 17 of the light emitting units 10a, 10b, 10c, 10d. On the other hand, it may be so that the process of putting the light emitting units 10a, 10b, 10c, 10d and the plate 50 together is followed by an action of pressing the light emitting units 10a, 10b, 10c, 10d and the plate 50 together at the position where the plate overlaps the recessed portions 16 of the light emitting units 10a, 10b, 10c, 10d, an action of supplying heat to that position, etc. Optionally, as an intermediate step, glue or solder may be added to the electrically conductive strips 17 of the light emitting units 10a, 10b, 10c, 10d and/or the contacting pads 52 of the plate 50, etc.

Further, it may be practical for the connection area 12 of the respective light emitting units 10a, 10b, 10c, 10d to comprise two electrically conductive strips 17, 18, wherein one of the strips 17, 18 is associated with a plus side of the internal electrical circuit 11, and wherein the other of the strips 17, 18 is associated with a minus side of the internal electrical circuit 11. In such a case, it may be appropriate for the electrical circuit 51 of the plate 50 to comprise a plus portion and a minus portion, generally at different positions/levels in the plate 50. The plate 50 may only be used for interconnecting the four light emitting units 10a, 10b, 10c, 10d, but it is also possible for the plate 50 to have additional functionalities. For example, the plate 50 may be equipped with at least one functional component such as a light source. This aspect of the plate 50 is independent of other features of the plate 50 such as size and shape, and also of the exact number of the light emitting units 10a, 10b, 10c, 10d to be electrically interconnected through the plate 50.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such an illustration and such a description are to be considered illustrative or exemplary only, and not restrictive. The invention is not limited to the disclosed embodiments. The drawings are schematic, wherein details that are not required for understanding the invention may have been omitted, and not necessarily to scale. As the invention is not particularly about the connection of a pattern 20 of light emitting units 10 to an electric power source 30 of a light emitting device 1, 2, 3, 4, 5, but rather relates to a clever way for electrically interconnecting the light emitting units 10, a depiction of an electric power source 30 is only provided in FIG. 1. For the sake of completeness, it is noted that this fact should not be understood so as to mean that the other embodiments of the invention do not include an electric power source 30 as well.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species".

A possible summary of the invention reads as follows. A light emitting device 1, 2, 4, 5 is provided that can be used in various contexts, including the context of realizing an anti-fouling action on surfaces. The light emitting device 1, 2, 4, 5 comprises light emitting units 10 being arranged in a plane filling pattern 20 for covering at least a substantial portion of a surface. Individual light emitting units 10 are electrically interconnected through connection areas 12, 13 as present on the light emitting units 10 for providing electrical access to an internal electrical circuit 11 thereof, wherein the light emitting units 10 overlap at the positions of at least portions of the connection areas 12, 13 thereof. Further, it may be so that at least one of the connection areas 12, 13 of the individual light emitting units 10 is electrically connected simultaneously to respective connection areas 12, 13 of at least two other light emitting units 10, so as to have an acceptable, practical level of electrical redundancy in the light emitting device 1, 2, 3, 4, 5 at only a minimum of electrical connections in the light emitting device 1, 2, 3, 4, 5.

The invention claimed is:

1. A light emitting device, comprising:
a plurality of light emitting units,
wherein the plurality of light emitting units are arranged in a plane filling pattern,
wherein the plane filling pattern is arranged to cover at least a substantial portion of a surface,
wherein each of the plurality of light emitting units comprises an internal electrical circuit and two connection areas,
wherein each of the two connection areas provides electrical access to the internal electrical circuit from outside of each of the light emitting units,
wherein the light emitting units are electrically interconnected through the two connection areas,
wherein the two connection areas of each of the light emitting units are situated at opposing corners of the light emitting units, thereby enabling each connection area to interconnect to connection areas of at least two other light emitting units at a common location area, and
wherein the two connection areas are interconnected within each of the light emitting units to provide electrical redundancy at the two connection areas.

2. The light emitting device of claim 1, wherein each of the plurality of light emitting units comprise two recessed portions, and
wherein the two connection areas of the light emitting units are situated in the two recessed portions.

3. The light emitting device of claim 2, comprising a plurality of connector elements that are situated within a recess region formed by recess areas of adjacent light emitting units, wherein the connector elements enable an interconnection of the adjacent light emitting units.

4. The light emitting device of claim 2, wherein at least four of the light emitting units are interconnected by overlapping recess areas of the at least four light emitting units.

5. The light emitting device of claim 1, wherein at least one of the two connection areas of each of the plurality of light emitting units is electrically connected simultaneously to respective connection areas of at least two other light emitting units.

6. The light emitting device of claim 5, wherein an electrical path between two positions where at least three light emitting units are interconnected through respective at least two connection areas extends through at least one light emitting unit.

7. The light emitting device of claim 1, wherein each of the two connection areas of at least one of the plurality of light emitting units is electrically connected simultaneously to respective connection areas of at least two other light emitting units.

8. The light emitting device of claim 1, wherein each of the two connection areas of at least one of the plurality of light emitting units are electrically connected simultaneously to respective connection areas of at least three other light emitting units.

9. The light emitting device of claim 1,
wherein at least two of the plurality of light emitting units overlap at the positions of at least portions of the at least two connection areas, and
wherein each of the plurality of light emitting units are electrically connected simultaneously to respective at least two connection areas of at least two other light emitting units.

10. The light emitting device of claim 1, further comprising an electric power source, wherein the electric power source is configured to power all of the light emitting units.

11. An assembly of a marine object and the light emitting device according to claim 1, the marine object comprising at least one surface that is intended to be at least partially submersed in a liquid containing biofouling organisms during at least a part of the lifetime of the marine object, wherein the light emitting device is arranged on the at least one surface.

12. The light emitting device of claim 1, wherein at least two of the plurality of light emitting units overlap at the positions of a portion of one of the two connection areas of the at least two of the plurality of light emitting units.

13. The light emitting device of claim 1, wherein each of the connection areas comprises at least two electrically conductive strips that are insulated from each other.

14. A light emitting device, comprising:
a plurality of light emitting units,
wherein the plurality of light emitting units are arranged in a plane filling pattern,
wherein the plane filling pattern is arranged to cover at least a substantial portion of a surface,
wherein each of the plurality of light emitting units comprise an internal electrical circuit and at least two connection areas,
wherein the at least two connection areas provide electrical access to the internal electrical circuit from outside of each of the light emitting units,
wherein the light emitting units are electrically interconnected through the at least two connection areas,
wherein at least two of the plurality of light emitting units overlap at the positions of a portion of the at least two connection areas, and
wherein each of the plurality of light emitting units comprise at least one light source that is configured to emit anti-fouling light.

15. A method for assembling a light emitting device, comprising:
providing a plurality of light emitting units,
wherein the plurality of light emitting units comprise an internal electrical circuit and two connection areas,
wherein each of the two connection areas provide electrical access to the internal electrical circuit from outside of the light emitting units;
arranging the plurality of light emitting units in a plane filling pattern, wherein the plane filling patter covers at least a portion of a surface; and
electrically interconnecting the light emitting units through the at least two connection areas,
wherein the two connection areas of each of the light emitting units are situated at opposing corners of the light emitting units, thereby enabling each connection area to interconnect to connection areas of at least two other light emitting units at a common location area, and
wherein the two connection areas are interconnected within each of the light emitting units to provide electrical redundancy at the two connection areas.

16. The method of claim 15,
wherein each of the plurality of light emitting units comprise two recessed portions, and
wherein the two connection areas of the light emitting units are situated in the two recessed portions.

17. The method of claim 15, wherein an arrangement is realized in which at least one of the two connection areas of each of the plurality of light emitting units is electrically connected simultaneously to respective connection areas of at least two other light emitting units.

18. The method of claim 15, wherein each of the two connection areas of at least one of the plurality of light emitting units is electrically connected simultaneously to a respective connection area of at least two other light emitting units.

19. The method of claim 15, wherein each of the two connection areas of at least one of the plurality of light emitting units is electrically connected simultaneously to a respective connection area of at least three other light emitting units.

20. The method of claim 15,
wherein at least two of the plurality of light emitting units overlap at the positions of at least portions of the at least two connection areas, and
wherein each of the plurality of light emitting units are electrically connected simultaneously to respective at least two connection areas of at least two other light emitting units.

21. The method of claim 15, wherein an electrical path between two positions where at least three light emitting units are interconnected through respective at least two connection areas extends through at least one light emitting unit.

22. The method of claim 15, wherein each of the plurality of light emitting units comprise at least one light source that is configured to emit anti-fouling light.

23. A light emitting unit comprising:
a light source,
two connection areas, and
an interconnection between the two connection areas;
wherein the interconnection establishes an electrical redundancy at the two connection areas;
wherein the two connection areas are situated at opposing corners of the light emitting unit,
wherein each of the two connection areas enable electrical access to a power source for the light source, and
wherein each of the two connection areas enable the light emitting unit to interconnect with at least two other light emitting units.

24. The light emitting unit of claim 23,
wherein the light emitting unit comprises two recessed areas, and
wherein the two connection areas are situated at the two recessed areas.

25. The light emitting unit of claim 24,
wherein the light emitting unit comprises an upper surface and a lower surface, wherein one of the two recessed areas is recessed in the upper surface, and wherein one of the two recessed areas is recessed in the lower surface.

26. The light emitting unit of claim 23, wherein each of the connection areas comprise at least two electrically conductive strips that are insulated from each other.

27. The light emitting unit of claim 23, wherein the light source is configured to emit anti-fouling light.

* * * * *